US010708666B2

(12) United States Patent
Lo et al.

(10) Patent No.: US 10,708,666 B2
(45) Date of Patent: Jul. 7, 2020

(54) TERRESTRIAL BROADCAST TELEVISION SERVICES OVER A CELLULAR BROADCAST SYSTEM

(71) Applicant: QUALCOMM Incorporated, San Diego, CA (US)

(72) Inventors: Charles Nung Lo, San Diego, CA (US); Thomas Stockhammer, Bergen (DE); Nagaraju Naik, San Diego, CA (US); Carlos Marcelo Dias Pazos, Carlsbad, CA (US); Gordon Kent Walker, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/684,481

(22) Filed: Aug. 23, 2017

(65) Prior Publication Data
US 2018/0063595 A1    Mar. 1, 2018

Related U.S. Application Data

(60) Provisional application No. 62/380,821, filed on Aug. 29, 2016.

(51) Int. Cl.
*H04N 21/61* (2011.01)
*H04N 21/63* (2011.01)
(Continued)

(52) U.S. Cl.
CPC ......... *H04N 21/6131* (2013.01); *H04L 12/00* (2013.01); *H04L 12/4625* (2013.01);
(Continued)

(58) Field of Classification Search
CPC ........... H04N 21/6131; H04N 21/4756; H04N 21/63; H04N 21/84; H04L 12/00; H04L 12/4625
See application file for complete search history.

(56) References Cited

U.S. PATENT DOCUMENTS 10,015,220 B2 *  7/2018  Lee ..................... H04L 65/4076
2003/0145064 A1 *  7/2003  Hsu ....................... H04L 12/189
                                                                  709/219
(Continued)

FOREIGN PATENT DOCUMENTS

CA    2918693 A1    5/2016
EP    2816868 A1   12/2014

OTHER PUBLICATIONS

"Advanced Television Systems Committee, ATSC Candidate Standard: Signaling, Delivery, Synchronization, and Error Protection (A/331), Doc. S33-174r1, Jan. 5, 2016" (Year: 2016).*
(Continued)

*Primary Examiner* — Hai V Tran
*Assistant Examiner* — Tien M Nguyen
(74) *Attorney, Agent, or Firm* — The Marbury Law Group

(57) ABSTRACT

Systems, methods, and devices of various embodiments enable the provision of providing terrestrial broadcast television services over a cellular broadcast system. In various embodiments, a processor of a network element of the cellular broadcast system may parse a terrestrial broadcast television service for one or more information elements. The processor may configure a service description of the cellular broadcast system to include the one or more information elements of the terrestrial broadcast television service. The processor may send the configured service description over the cellular broadcast system to a receiving device to enable the receiving device to receive the terrestrial broadcast television service over the cellular broadcast system.

25 Claims, 19 Drawing Sheets

(51) Int. Cl.
  *H04L 12/46*    (2006.01)
  *H04N 21/84*    (2011.01)
  *H04L 12/00*    (2006.01)
  *H04N 21/475*   (2011.01)

(52) U.S. Cl.
  CPC ......... *H04N 21/4756* (2013.01); *H04N 21/63* (2013.01); *H04N 21/84* (2013.01)

(56) References Cited

U.S. PATENT DOCUMENTS

| | | | | |
|---|---|---|---|---|
| 2005/0125837 A1* | 6/2005 | Farmer | ............... | H04J 14/028 725/105 |
| 2006/0282857 A1* | 12/2006 | Kim | ............... | H04H 60/39 725/48 |
| 2007/0074266 A1* | 3/2007 | Raveendran | ............... | H04N 5/144 725/135 |
| 2010/0153998 A1* | 6/2010 | Paik | ............... | H04H 20/24 725/39 |
| 2013/0182643 A1 | 7/2013 | Pazos et al. | | |

OTHER PUBLICATIONS

3GPP TS 26.346 V12.10.0 (Jun. 2016), pp. 26-31. (Year: 2016).*
International Search Report and Written Opinion—PCT/US2017/048346—ISA/EPO—dated Nov. 7, 2017.
ITU-T Rec. F.750, Series F: Non-Telephone Telecommunication Services, Audiovisual Services, Metadata Framework, ITU-T Recommendation F.750, Feb. 2005, 28 Pages.

* cited by examiner

300

| Syntax | Number of bits | Identifier |
|---|---|---|
| bouquet_association_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     bouquet_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     bouquet_descriptors_length | 12 | uimsbf |
|     for(i=0;i<N;i++){ | | |
|         descriptor() | | |
|     } | | |
|     reserved_future_use | 4 | bslbf |
|     transport_stream_loop_length | 12 | uimsbf |
|     for(i=0;i<N;i++){ | | |
|         transport_stream_id | 16 | uimsbf |
|         original_network_id | 16 | uimsbf |
|         reserved_future_use | 4 | bslbf |
|         transport_descriptors_length | 12 | uimsbf |
|         for(j=0;j<N;j++){ | | |
|             descriptor() | | |
|         } | | |
|     } | | |
|     CRC_32 | 32 | rpchof |
| } | | |

FIG. 3

| Syntax | Number of bits | Identifier |
|---|---|---|
| service_description_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for(i=0;i<N;i++){ | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for(j=0;j<N;j++){ | | |
|             descriptor() | | |
|         } | | |
|     } | | |
|     CRC_32 | | |
| } | 32 | rpchof |

| Syntax | Number of bits | Identifier |
|---|---|---|
| event_information_section ( ) { | | |
|     table_id | 8 | uimsbf |
|     section_syntax_indicator | 1 | bslbf |
|     reserved_future_use | 1 | bslbf |
|     reserved_section_length | 2 | bslbf |
|     service_id | 12 | uimsbf |
|     reserved | 16 | uimsbf |
|     version_number | 2 | bslbf |
|     current_next_indicator | 5 | uimsbf |
|     section_number | 1 | bslbf |
|     last_section_number | 8 | uimsbf |
|     transport_stream_id | 8 | uimsbf |
|     original_network_id | 16 | uimsbf |
|     segment_last_section_number | 16 | uimsbf |
|     last_table_id | 8 | uimsbf |
|     for(i=0;i<N;i++){ | 8 | uimsbf |
|         event_id | | |
|         start_time | 16 | uimsbf |
|         duration | 40 | bslbf |
|         running_status | 24 | uimsbf |
|         free_CA_mode | 3 | uimsbf |
|         descriptors_loop_length | 1 | bslbf |
|         for(j=0;j<N;ji++){ | 12 | uimsbf |
|             descriptor() | | |
|         } | | |
|     } | | |
|     CRC_32 | | |
| } | 32 | rpchof |

| | No. of bits | Identifier |
|---|---|---|
| application_information_section () { | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    test_application_flag | 1 | bslbf |
|    application_type | 15 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    reserved_future_use | 4 | bslbf |
|    common_descriptors_length | 12 | uimsbf |
|    for(i=0;i<N;i++){ | | |
|       descriptor() | | |
|    } | | |
|    reserved_future_use | 4 | bslbf |
|    application_loop_length | 12 | uimsbf |
|    for(i=0;i<N;i++){ | | |
|       application_identifier() | | |
|       application_control_code | 8 | uimsbf |
|       reserved_future_use | 4 | bslbf |
|       application_descriptors_loop_length | 12 | uimsbf |
|       for(j=0;j<N;j++){ | | |
|          descriptor() | | |
|       } | | |
|    } | | |
|    CRC_32 | 32 | rpchof |
| } | | |

FIG. 10

TERRESTRIAL BROADCAST TELEVISION SERVICES OVER A CELLULAR BROADCAST SYSTEM

RELATED APPLICATIONS

This application claims the benefit of priority to U.S. Provisional Application No. 62/380,821 entitled "Terrestrial Broadcast Television Services Over a Cellular Broadcast System" filed Aug. 29, 2016, the entire contents of which are hereby incorporated herein by reference.

BACKGROUND

Mobile cellular networks are being expanded and enhanced to provide an increasingly wide range of services. One area of service development includes migrating terrestrial broadcast television (TV) services delivery onto cellular broadcast networks. Providing broadcast TV services over a cellular broadcast network may permit reuse of ultrahigh frequency (UHF) spectrum that is currently assigned for broadcast TV service distribution for, as one example, for, wireless broadband communications and multimedia content delivery. However, cellular broadcast systems are not currently configured to provide the full range of currently-available broadcast TV services, and cross-technology service delivery migration will be required in order to support the delivery of broadcast TV services over cellular broadcast networks.

SUMMARY

Various embodiments include methods, and network elements and receiver devices that may implement the methods, for providing terrestrial broadcast television services over a cellular broadcast system. In various embodiments, a network element of the cellular broadcast network may configure information of messages of the cellular broadcast system to provide transport and application-related signaling that may enable terrestrial broadcast television services provided over a cellular broadcast system.

Various embodiments may include parsing a terrestrial broadcast television service for one or more information elements, configuring a service description of a cellular broadcast system to include the one or more information elements of the terrestrial broadcast television service, and sending the configured service description over the cellular broadcast system to a receiving device to enable the receiving device to receive the terrestrial broadcast television service over the cellular broadcast system.

In some embodiments, the parsed one or more information elements may include at least one transport signaling element. In some embodiments, the parsed one or more information elements may include at least one application signaling element. In some embodiments, the service description may include a user service description.

In some embodiments, the service description may include a user service bundle description. In such embodiments, the service description may include the user service bundle description and one or more information elements references by the user service bundle description. In such embodiments, the user service bundle description may include a user service description.

In some embodiments, the service description may include one or more of an application service description, a program description, an application signaling description, a component description, or a rating description. In some embodiments, configuring the service description of the cellular broadcast system to include the one or more information elements of the terrestrial broadcast television service may include adding the one or more information elements to one or more existing information elements of the service description. In some embodiments, configuring the service description of the cellular broadcast system to include the one or more information elements of the terrestrial broadcast television service may include adding one or more new elements to the service description and adding the one or more information elements to the one or more new elements of the service description.

Some embodiments may further include receiving from the receiving device a registration for the terrestrial broadcast television service, wherein the registration is based on the configured service description. Some embodiments may further include providing the terrestrial broadcast television service to the receiving device over the cellular broadcast system.

Further embodiments include a network element having a network access port configured to interface with a communications network and a processor coupled to the network access port and configured with processor-executable instructions to perform operations of the methods summarized above. Further embodiments include a network element having means for performing functions of the methods summarized above. Further embodiments include a non-transitory processor-readable medium having stored thereon processor-executable instructions configured to cause a processor of a network element to perform operations of the methods summarized above.

BRIEF DESCRIPTION OF THE DRAWINGS

The accompanying drawings, which are incorporated herein and constitute part of this specification, illustrate examples of the various embodiments, and together with the general description given above and the detailed description given below, serve to explain the features of the various embodiments.

FIG. 3 is an illustration of terrestrial broadcast service information that may be used in various embodiments.

FIG. 5 is an illustration of terrestrial broadcast service information that may be used in various embodiments.

FIG. 7 is an illustration of terrestrial broadcast service information that may be used in various embodiments.

FIG. 10 is an illustration of a data model of information used in broadcast or multicast communication system according to various embodiments.

DETAILED DESCRIPTION

Figure 1:
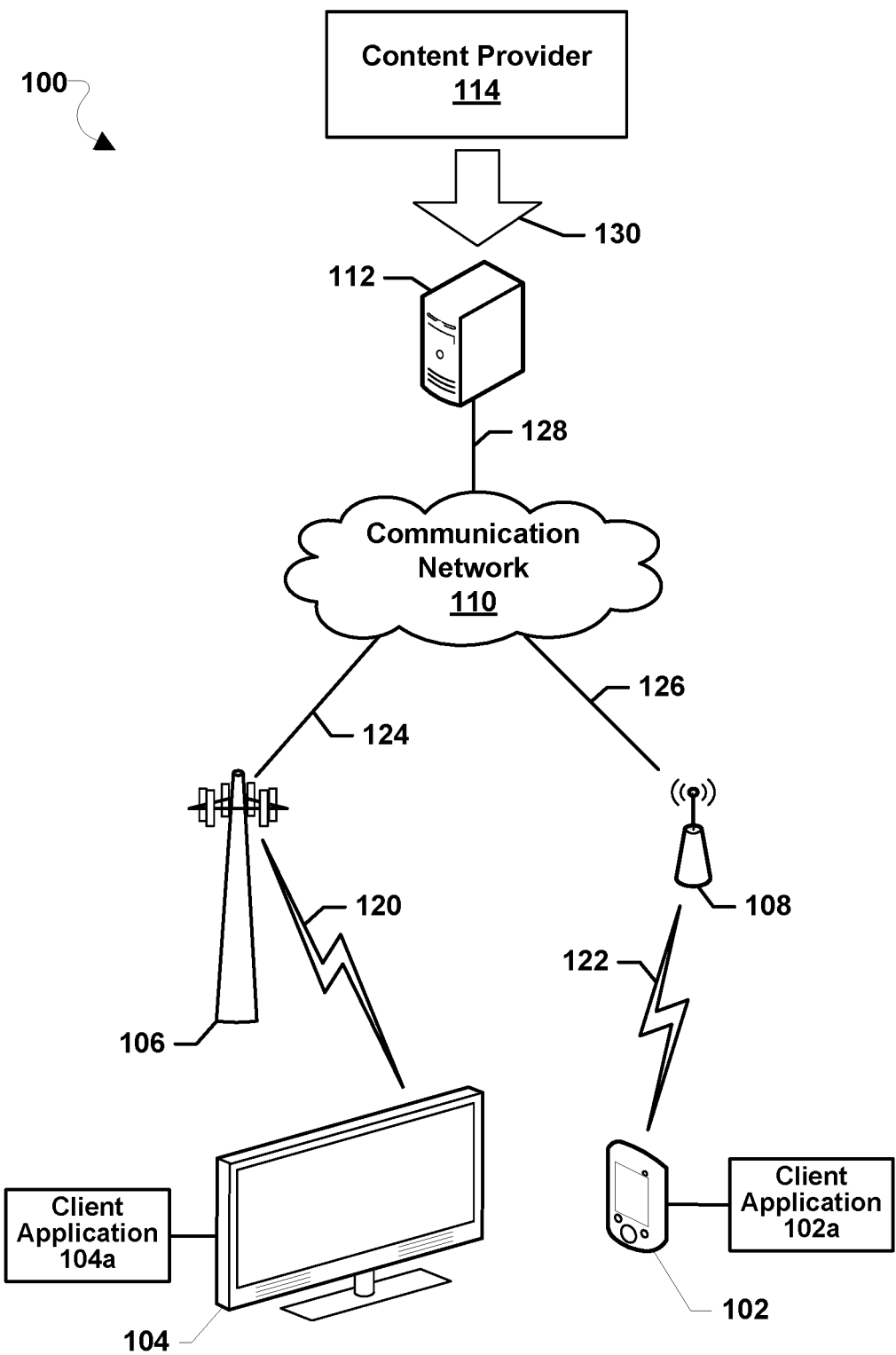
FIG. 1 is a block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the various embodiments or the claims.

The term "receiver device" refers to an electronic device that includes a programmable processor and memory and circuitry for receiving and presenting media content. Examples of a receiver device may include cellular telephones, smartphones, personal or mobile multimedia players, personal data assistants (PDAs), laptop computers, tablet computers, smartbooks, palmtop computers, wireless electronic mail receivers, multimedia Internet enabled cellular telephones, wireless gaming controllers, personal computers, television set top boxes, televisions, cable television receivers, and other similar electronic devices.

The term "network element" refers to any computing device capable of functioning as a provider of content data and service signaling information related to the content data, such as a web server, an application server, a content server, a multimedia server, or any other type of server. A network element may include a dedicated computing device or a computing device including a server component (e.g., running an application that may cause the computing device to operate as a server). A server component (e.g., a server application) may be a full function server component, or a light or secondary server component (e.g., light or secondary server application).

Capabilities of mobile cellular networks are being expanded to provide an increasingly wide range of services, such as terrestrial broadcast television (TV) services delivery via cellular broadcast networks. Digital Terrestrial Television (DTT) refers generally to broadcast television technologies. Examples of DTT technologies that may be delivered over cellular broadcast networks include Digital Video Broadcasting (DVB)—Terrestrial/Second Generation Terrestrial (DVB-T/T2) and Advanced Television Systems Committee (ATSC) 3.0. Examples of cellular broadcast systems that may support DTT services delivery include Third Generation Partnership Project (3GPP) Multimedia Broadcast Multicast Service (MBMS), Enhanced MBMS (eMBMS), and Third Generation Partnership Project 2 (3GPP2) Broadcast And Multicast Service (BCMCS).

The provision of DTT services over cellular broadcast networks may utilize a digital broadcast streaming technique. For example, adaptive bitrate streaming may be used in streaming video, audio, and other multimedia data over a communication network. Examples of adaptive bitrate streaming techniques include Dynamic Adaptive Streaming over Hypertext Transfer Protocol (HTTP) (DASH), Adobe Dynamic Streaming for Flash, Apple HTTP Live Streaming (HLS), and Microsoft Smooth Streaming.

DASH is a streaming standard supporting adaptive streaming using the HTTP protocol. In one variant of DASH, media intervals may be composed of one or more layered chunks, and each additional layered chunk added to a base layer chunk may increase the quality of the media presentation for that media interval. Each media presentation may be encoded using a scalable encoder such that each media interval includes a base layer chunk and one or more enhanced layer chunks.

Delivery of digital broadcast content may be accomplished using an appropriate transport protocol such as File Delivery over Unidirectional Transport (FLUTE) or Real-time Object delivery over Unidirectional Transport (ROUTE), which may be used for the unidirectional delivery of digital media over networks utilizing Internet Protocol (IP).

Upper layer delivery and service layer standards (e.g. International Standards Organization (ISO) Layer 3 and above) of many DTT systems typically define signaling metadata at the transport/access level, as well as at the application service level. Transport/access level signaling metadata may include parameters related to the transmission and reception of associated TV services, which may be used by a receiving device to acquire service content that is broadcast over a physical layer radio technology of that DTT system. Application service level signaling metadata may include descriptive information that enables a receiving device to present a program guide describing the contents and the playout schedule of the program events of a service (e.g., via an interactive user interface for an end user). The descriptive information may also provide user control to discover, navigate among, and select DTT services for reception and presentation by the receiving device.

To enable delivery of DTT services over a cellular broadcast network, information elements of messages of the cellular broadcast network may be configured to provide service signaling that is analogous to information currently provided for terrestrial TV broadcast services. For example, to broadcast TV services delivery over cellular broadcast systems such as 3GPP MBMS or 3GPP2 BCMCS, network elements of a cellular broadcast system may be configured to provide transport and application signaling to enable the native transport and application related service signaling that is defined in terrestrial broadcast TV standards (e.g., DVB-T/T2 and ATSC 3.0).

Various embodiments include methods, and network elements (e.g., servers) and receiver devices of a cellular broadcast system that are configured to perform the methods, for providing terrestrial broadcast television services over the cellular broadcast system. In some embodiments, a network element of a cellular broadcast system may modify a user service description (USD), based on one or more terrestrial broadcast television services. As used herein "USD" refers to MBMS User Service Discovery/Announcement information, which may include a set of Extended Markup Language (XML)-encoded metadata fragments. In some embodiments, a network element of a cellular broadcast system may modify a user service description bundle (USBD) based on the one or more terrestrial broadcast television services. The USBD may be a metadata fragment included in the USD, and may enable an MBMS client application to discover and access other metadata fragments (such as a media presentation description (MPD), initialization segment description (ISD), application program description (APD), Schedule Description, etc.).

Typically, the unmodified USD is configured to include information that enables a receiver device to acquire and retrieve a broadcast of the cellular broadcast system, such as transport signaling information. However, the unmodified USD is typically not designed to provide application related service signaling for DTT services (for example, Electronic Program Guide (EPG) functionality).

In various embodiments, a network element of the cellular broadcast system may modify a USD announcement, which is configured for use in the cellular broadcast system, to carry information related to or based on one or more terrestrial broadcast television services. In some embodiments, the user service description may include an MBMS User Service Discovery and Announcement, as may be used in a 3GPP MBMS service layer (one example of which is defined in 3GPP technical specification (TS) 26.346 entitled "Multimedia Broadcast/Multicast Service (MBMS); Protocols and codecs").

In some embodiments, the network element may modify the USD to include information that enables the cellular broadcast system to translate and/or map native DTT signaling to functionally-equivalent cellular broadcast system signaling or related service layer semantics. For example, the network element may configure the USD to provide service signaling information of DVB-T/T2 or ATSC 3.0.

In some embodiments, the network element may configure the USD to include service layer information based on terrestrial broadcast service information. The terrestrial broadcast service information may include, for example, DVB system information (SI) or ATSC 3.0 Service Layer Signaling (SLS). The service layer information included in the USD may enable the network element to describe a DTT service to a client application, e.g., via an Electronic Program Guide (EPG) application in the receiver. The service layer information also may enable a receiver device to discover and acquire the DTT service over the cellular broadcast system.

For example, DVB SI may include one or more signaling tables (e.g., binary-encoded signaling structures) that describe one or more terrestrial television services. Examples of information that may be included within table in the DVB SI include the structure of an a Moving Picture Experts Group (MPEG)-2 Transport Stream, one or more services carried within the transport stream, how such services may be acquired by a receiver device, and information related to the one or more services that may be presented by the receiver device. Each SI table may include mandatory and optional descriptors carrying relevant information to its function, such as information on the network, delivery system, country availability, frequency, conditional access system, package, service, event (program), subtitling, language, media components, genre, rating, etc. Since not all SI information may be required for delivery of DTT services, in some embodiments, the network element may selectively configure the USD based on the terrestrial broadcast service information. For example, many PSI/SI tables may be unnecessary for the delivery of DVB services over the cellular broadcast system, such as information unique to terrestrial broadcast network concepts, system operation, and MPEG-2 transport streams.

In some embodiments, the network element may configure the USD to identify one or more logical types of DTT service signaling metadata. The DTT service signaling metadata may enable the functioning of one or more client applications running on a receiving device.

In some embodiments, the network element may configure the USD to provide one or more of the following information:
Service package/bundle name;
Service type information;
Terrestrial broadcast service and program IDs;
Program level information;
Identification of media components of a service or program;
Interactive applications, if any, associated with the broadcast TV service;
Definition of Near Video On Demand (NVOD) services and time-shift characteristics;
Content management of contents in FTA (Free-To-Air) services;
Linkage to auxiliary service providing more information on a main service or program, an alternative version of the content of the service or program, or a replacement service or program;
Conditional Access system information;
Genre/classification information at the program level; and
Parental rating/guidance information (which may be geographical region specific in the form of a Rating Region Table (RRT)).

For example, one or more of the above types of information may be provided in DVB SI tables, such as a Bouquet Association Table (BAT), a Service Description Table (SDT), and an Event Information Table (EIT). In addition, DVB SI may also provide information about interactive applications bound to linear TV services in an Application Information Table (AIT). In some embodiments, the network element may modify the USD based on information included in one or more metadata structures of the terrestrial broadcast television service. For example, to modify the USD based on DVB information, the network element may modify the USD based on information included in one or more of the Bouquet Association Table, the Service Description Table, the Event Information Table, and the Application Information Table. In some embodiments, the network element may modify the USD based on analogous information included in a metadata structure of another terrestrial broadcast television service (e.g., ATSC 3.0).

In some embodiments, the network element may configure the USD to include electronic program guide (EPG) signaling functionality and transport signaling functionality based on translation of similar information from a terrestrial broadcast TV service. For example, the network element may add information to provide such functionality in one or more existing information elements of the USD (e.g., one or more fragments). In some embodiments, the DTT system's native electronic program guide (EPG) functionality and transport functionality may be encapsulated, without modification, for transport over the cellular broadcast network using the native transport protocol of the cellular broadcast network (e.g., Internet Protocol). Subsequent processing of such transport and EPG signaling at the receiving device is in accordance to the transport and application signaling mechanisms defined for that DTT system.

In some embodiments, a transport signaling function of the USD may be extended in two ways. First, transport and/or content access related signaling information may be added to the USD based on the information from the terrestrial broadcast TV service. For example, the USD may be modified to include transport/access signaling information, such as package, service and program identifiers, a conditional access system ID, media component information, linkage to auxiliary service or content, targeted availability area, and Free-to-Air (FTA) remote access rules.

Second, application service signaling, such as EPG information, may be added to the USD based on the terrestrial broadcast TV service. In some embodiments, the EPG information may be added to existing information elements of the USD and/or to one or more new information elements of the USD. For example, in 3GPP MBMS, the User Service Bundle Description (USBD) metadata fragment of USD functionality may be expanded to carry EPG information pertaining to a broadcast TV service package (such as a bundle of TV channels) or single TV service offering, and a new metadata fragment may be defined to carry program-level description for each individual service. In various embodiments, USBD may be one of a plurality of XML-encoded metadata fragments that provide information in a composite MBMS User Service Discovery/Announcement.

A possible advantage of this approach to extending the transport signaling function of the USD is the creation of a comprehensive USD structure that is capable of supporting both transport and application service metadata. However, the comprehensive USD structure may mix transport signaling with application signaling in a common data structure, and thus may require restructuring or rewriting of aspects of service layer/middleware of the cellular broadcast system (e.g., a client application deployed in a receiver device) to perform, for example, processing and presentation of EPG information.

In some embodiments, the network element may add EPG-related signaling information to an existing information element. For example, the network element may receive terrestrial broadcast media content from a media encoder and may transmit the media content and metadata using USD service signaling and protocols natively over the cellular broadcast system (e.g., using an IP delivery protocol (such as FLUTE) that is defined for MBMS. In such embodiments, EPG data may be carried in an application data container that is already defined and allocated in the MBMS service layer standard as the Application Service Description (ASD) for carrying application service description information. The data residing in that application data container may be application-specific, and may be outside the scope of USD functionality for providing transport signaling. For example, the network element may configure the USD to only include information based on transport signaling for a terrestrial broadcast TV service. In some embodiments, the network element may modify a USD to add transport signaling information of a terrestrial broadcast TV service, and may define the contents of an ASD to include EPG related information of the terrestrial broadcast TV service.

In some embodiments, terrestrial broadcast EPG information may be delivered as a cellular broadcast system user service, for which the user or client of that service is a television EPG application, which may reside in a receiver device alongside a linear TV service application. The service information may be used by such an EPG application without further instructions (e.g., rewriting, modification, or additional programming).

In some embodiments, in a DASH-over-MBMS application service, the ASD may include a DASH Media Presentation Description (MPD) as an MPD fragment of an MBMS USD. In some embodiments, the Application Service Description (ASD) may include a manifest file corresponding to a multimedia presentation carried over adaptive HTTP streaming in the Apple HLS, or MPEG Common Media Application Format (CMAF), or as the launch page (default home page) of a hypertext markup language (HTML) media presentation. In such embodiments, transport signaling and application service signaling information may be transmitted separately.

In some embodiments, the network element may associate a service ID known to a client application (e.g., of a receiver device) associated with the EPG information service, and the client application (of the receiver device) may request the receiver middleware to download and provide the service contents associated with the EPG service ID in order to receive the EPG information. In such embodiments, the network element may add information to the USD (or to a user service bundle description USBD) to convey transport signaling that may enable the acquisition by the client application of the EPG service as well as transport signaling to enable the acquisition of a nominal terrestrial broadcast TV service, the latter of which may be transported as a different user service of the cellular broadcast network. In some embodiments, the terrestrial broadcast TV EPG information may be handled (e.g., by the network element) as a user service (e.g., an individual MBMS User Service), and may not be added to the USD. For example, a client application of a receiver device may request the EPG service via a user service acquisition application programming interface (API). Alternatively or additionally, the EPG service may be associated with a Service ID or Service Class value, which may be preconfigured in the broadcast receiver middleware that will download and provide the contents of that EPG service to the client application upon, for example, the application having registered with the middleware, for example via a registration API, to enable the client application to receive cellular broadcast user services via the middleware.

Various embodiments may be implemented in a variety of communication systems, such as a communication system 100, an example of which is illustrated in FIG. 1.

A receiver device (such as the receiver devices 102 and 104) may communicate with a communication network 110. The communication network 110 may include a base station 106, an access point 108, and a network element 112. The base station 106 may communicate with the communication network 110 over a wired or wireless communication link 124, and the access point 108 may communicate with the communication network 110 over a wired or wireless communication link 126. The communication links 124 and 126 may include fiber optic backhaul links, microwave backhaul links, and other communication links. In some embodiments, the communication network 110 may include a cellular communication or mobile telephony communication network. In various embodiments, the communication network 110 may include a cellular broadcast system. The receiver devices 102 and 104 may communicate with the base station 106 over a wireless communication link 120, and with the access point 108 over a wireless communication link 122.

The network element 112 may be a Broadcast-Multicast Service Center (BM-SC), BCMCS (Broadcast and Multicast Service) Content Server, an application server, a content server, a media server, or another network node or network element configured to provide content data for the receiver devices 102 and 104. The network element 112 may communicate with the communication network 100 over a wired or wireless communication link 128. The network element 112 may receive media content 130 from a content provider 114. In some embodiments, the content provider 114 may include a broadcaster or other provider of terrestrial television services. The terrestrial television services may broadcast one or more terrestrial TV services using a terrestrial TV broadcast system that may employ, for example, DVB-T/T2 or ATSC 3.0. The terrestrial TV service(s) provided by the content provider 114 may include media content and terrestrial broadcast service information, for example, DVB system information (SI) or ATSC 3.0 Service Layer Signaling (SLS).

In some embodiments, the network element 112 may create (e.g., generate) a user service bundle description (USBD) based on terrestrial broadcast service information. The network element 112 may transmit the USBD, and the receiver devices 102 and 104 may receive the USBD. In some embodiments, the network element 112 may create (e.g., generate) a user service description (USD) based on terrestrial broadcast service information. The network element 112 may transmit the USD, and the receiver devices 102 and 104 may receive the USD. The network element 112 may also provide the received media content via one or more Digital Terrestrial Television (DTT) services. In some embodiments, the network element 112 may create (e.g., generate) an application service description (ASD) based on terrestrial broadcast service information. The network element 112 may transmit the ASD, and the receiver devices 102 and 104 may receive the ASD.

Based at least in part on the DTT service specific USBD, USD and/or ASD, the receiver devices 102 and 104 may register for eligibility, or indicate interest to receive broadcast receive content data, such as a DTT service, to the network element 112 over the communication network 110. For example, the receiver devices 102 and 104 a send a message to the network element 112 to register for eligibility, or to indicate an interest in receiving, broadcast content data. In response to a registration or indication of interest for reception of broadcast content data from a receiving device, the network element 112 may receive media content data (e.g., from the content provider 114) and may forward the media content to a client application running on one of the receiver devices 102 and 104 (such as the client applications 102a and 104a, respectively) over one or more wired or wireless communication links 120, 122. In some embodiments, the receiver device 102, 104 may receive the requested content data over a single interface (e.g., over a cellular communication interface, or over a Wi-Fi communication interface). In some embodiments, the receiver device 102, 104 may receive the content data over multiple interfaces (e.g., over Wi-Fi and cellular communication interfaces), and the receiver device 102, 104 may receive multiple parallel streams over the multiple network interfaces.

The communication network 110 may support communications using one or more radio access technologies, and each of the wireless communication links 120 and 122 may include cellular connections that may be made through two-way wireless communication links using one or more radio access technologies. Examples of radio access technologies may include 3GPP Long Term Evolution, (LTE), Global System for Mobility (GSM), Code Division Multiple Access (CDMA), Time Division Multiple Access (TDMA), Wideband CDMA (WCDMA), Worldwide Interoperability for Microwave Access (WiMAX), a radio access protocol in the Institute of Electrical and Electronics Engineers (IEEE) 802.11 or IEEE 802.15 family of protocols (e.g., Wi-Fi, Bluetooth, etc.), and other radio access technologies. While the communication links 120 and 122 are illustrated as single links, each of the communication links may include a plurality of frequencies or frequency bands, each of which may include a plurality of logical channels.

Figure 2:
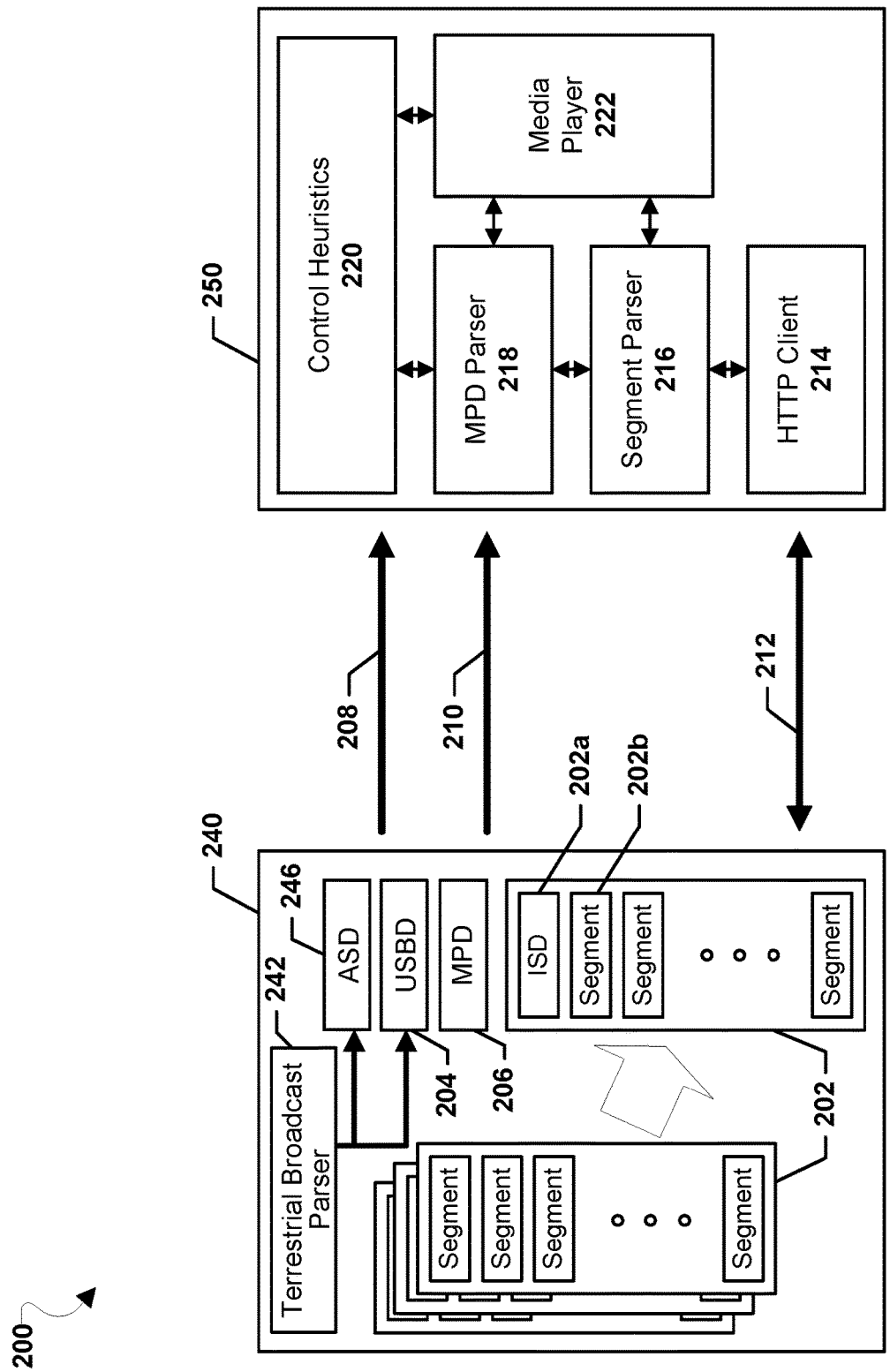
FIG. 2 is a block diagram of a communication system suitable for use with various embodiments.

FIG. 2 illustrates a communication system 200 suitable for use with various embodiments. With reference to FIGS. 1 and 2, the communication system 200 may include a network element 240 (which may be similar to the network element 112) and a receiver device 250 (which may be similar to the receiver devices 102 and 104). The network element 240 may have access to content data, which may include a plurality of media presentations 202. A media presentation may include an initialization segment description (ISD) 202a and a plurality of media segments 202b. The ISD 202a may function as a container for initialization segment information, e.g., in MPEG DASH systems. The network element 240 may also include a service parameter description of media broadcasts, such as a user service bundle description (USBD) 204, an application service description (ASD) 246, and a media description file, such as an MPD 206, or other data description. The USBD 204 may function as a metadata fragment for a MBMS user service discovery/announcement. The MPD 206 may function as a container for media presentation description information, e.g., in MPEG DASH. The USBD 204 and/or the ASD 246 may be delivered 208 to the receiver device 250 in an overhead transmission of a streaming media service. The MPD 206 may be delivered 210 to the mobile communication device 102 with the media presentation (i.e., with the content data) or in separate signaling. The media presentations 202 may be provided 212 to the mobile communication device 102, e.g., by a Hypertext Transfer Protocol (HTTP) content stream.

The network element 240 may include a terrestrial broadcast parser 242, which may parse a terrestrial broadcast TV service for one or more information elements. The network element may modify information elements of the USBD 204 and/or the ASD 246, or may add information elements to the USBD 204 and/or the ASD 246, based on information parsed from the terrestrial broadcast TV service. The information may include transport and/or application related signaling information of the terrestrial broadcast TV service.

The receiver device 250 may include control heuristics 220 that may control the operation of an HTTP client 214, segment parser 216, an MPD parser 218, and a media player 222. The HTTP client 214 may request and receive the content data in the form of the media presentations 202. The MPD parser 218 may process the MPD 206 to obtain definitions of the initialization segment description 202a and the media segments 202b. The segment parser 216 may process the media segments 202b to obtain the content data. The media player 222 (which may be similar to the client applications 102a and 104a) may use definitions from the MPD 206 (such as timing information, data segment definitions, and other description information) to process and present content data provided by the segment parser 216.

FIG. 3 illustrates a subset of terrestrial broadcast service information 300 that may be used in various embodiments. With reference to FIGS. 1-3, a content provider (such as the content provider 114) may provide the terrestrial broadcast service information 300 to a network element of a cellular broadcast system (such as the network element 112 and 240). The content provider may provide the terrestrial broadcast service information together with, parallel to, or separate from media content (such as terrestrial broadcast media content).

The terrestrial broadcast service information 300 is an example of a Bouquet Association Table (BAT), as may be used in a DVB system. The BAT may include Service Information (SI) metadata that may be used in an MPEG-2 transmission stream. In some embodiments, the BAT may include information describing one or more terrestrial broadcast television service groups or packages that enables the receiver device to present (e.g., on a display) an availability of the one or more groups of services. A group of services may be referred to in DVB as a "bouquet." In some embodiments, the BAT may include such information (e.g., in one or more descriptors) as a bouquet name, a conditional access identifier, a country availability, a linkage (such as to another service or transport stream), a multilingual bouquet name, and other information.

Figure 4:
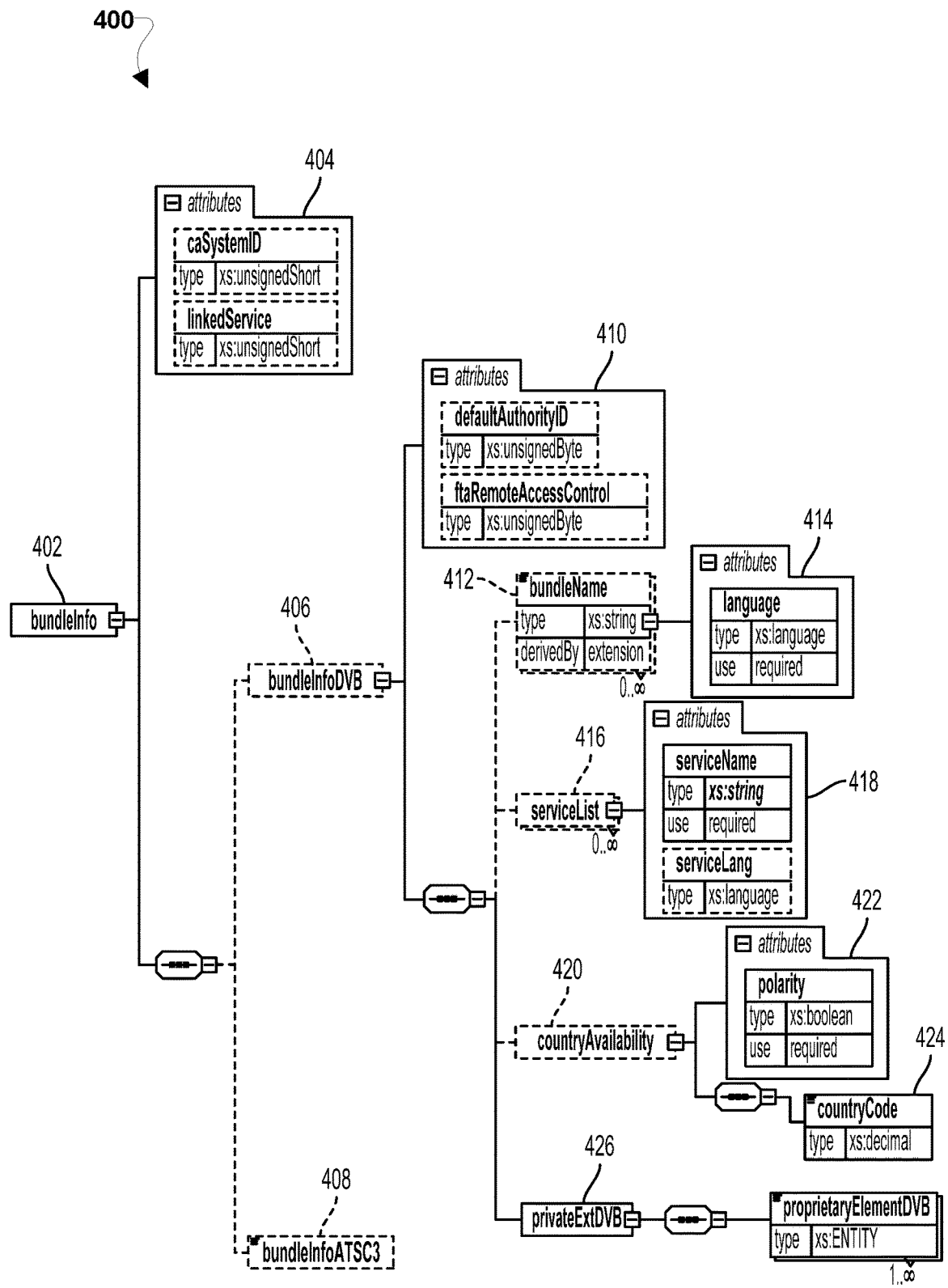
FIG. 4 is an illustration of a user service bundle description (USBD) according to various embodiments.

FIG. 4 illustrates a portion of a user service bundle description (USBD) metadata fragment 400 according to various embodiments. With reference to FIGS. 1-4, the USBD 400 may be similar to the USBD 204. In various embodiments, a network element of a cellular broadcast system (such as the network element 112 and 240) may configure the USBD 400 to include information that enables the cellular broadcast system to provide DTT services using terrestrial broadcast media content and service information. In some embodiments, the network element may configure the USBD 400 based on information included in terrestrial broadcast service information, such as a Bouquet Association Table (such as the BAT 300).

In some embodiments, the configured USBD 400 may include a new element (such as bundleInfo element 402) that may describe information that may enable a receiving device to receive and present one or more DTT services. In some embodiments, the new element (e.g., bundleInfo element 402) may be added to or included with an existing element of the USBD 400 (for example, a bundleDescription element or another similar element).

The bundleInfo element 402 may include the information based on the terrestrial broadcast service information (such as the BAT 300) in a variety of data elements. In some embodiments, the information may include device and user-centric signaling information.

In some embodiments, the network element (e.g., the network element 112 and 240) may add one or more data elements to the bundleInfo element 402 to convey information that may enable a receiving device to receive and present the DTT service. In some embodiments, the network element may add one or more data elements that include device and user display-specific metadata to the bundleInfo element 402.

Examples of device metadata may include elements describing one or more DTT services in a package (such as bundleInfoDVB element 406), a conditional access system identifier (such as caSystemID element 404), country availability information (such as countryAvailability element 420, which may include a blacklist/whitelist indication via a polarity flag 422 and an associated country code 424), linked services information (such as the serviceList element 416), Free To Air content management policy information (such as ftaRemoteAccessControl element 410), and other data elements. Examples of end-user display metadata may include elements describing a package name (such as bundleName 412) in one or more languages (such as a language element 414), a service name and type of each service in the package (such as serviceName element 418), and other data elements. The network element may also add one or more additional data elements that are configurable to include a variety of additional information (such as privateExtDVB element 426).

Although the data elements 404-426 are illustrated as DVB-related data elements, this is not intended as a limitation, and in some embodiments, the bundleInfo element 402 may include one or more data elements related to a different terrestrial broadcast system (such as bundleInfoATSC3 element 408, which may include ATSC 3.0-related data elements). In some embodiments, the bundleInfo element 402 may include information related to two or more different terrestrial broadcast systems (such as information related to both DVB and ATSC 3.0, for example, in elements 406 and 408).

FIG. 5 illustrates terrestrial broadcast service information 500 that may be used in various embodiments. With reference to FIGS. 1-5, a content provider (such as the content provider 114) may provide the terrestrial broadcast service information 500 to a network element of a cellular broadcast system (such as the network element 112 and 240). The content provider may provide the terrestrial broadcast service information together with, parallel to, or separate from media content (such as terrestrial broadcast media content).

The terrestrial broadcast service information 500 is an example of a Service Description Table (SDT), as may be used in a DVB system. The SDT may include Service Information (SI) metadata that may be used in an MPEG-2 transmission stream. In some embodiments, the SDT may include information describing one or more terrestrial broadcast television services that are included in a terrestrial broadcast system (such as in a particular network). In some embodiments, the SDT may include such information (e.g., in one or more descriptors) as a conditional access identifier, a country availability, a linkage (such as to another service), a Near Video On Demand (NVOD) reference, and other information.

Figure 6A:
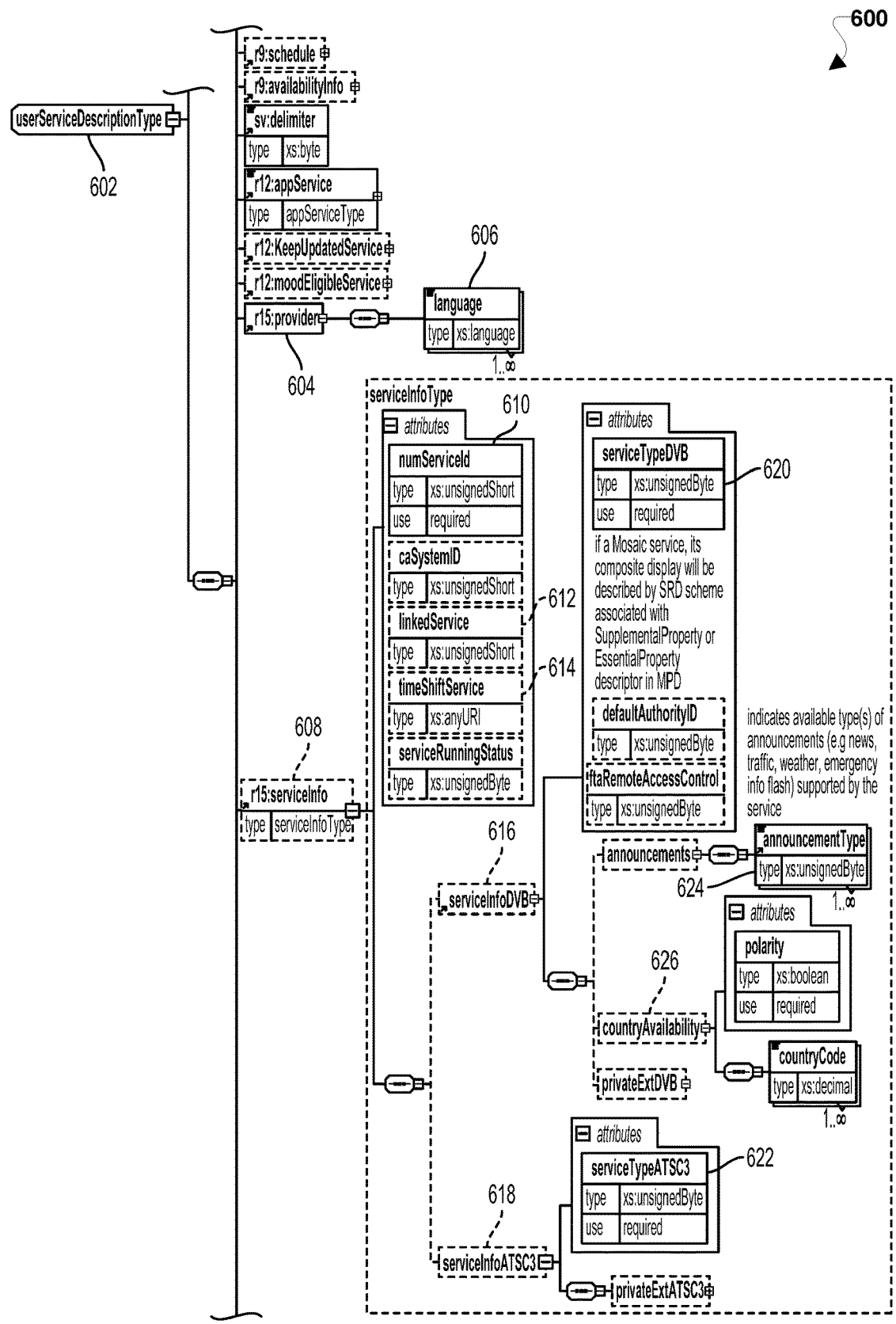
FIGS. 6A and 6B are illustrations of a USBD according to various embodiments.
Figure 6B:
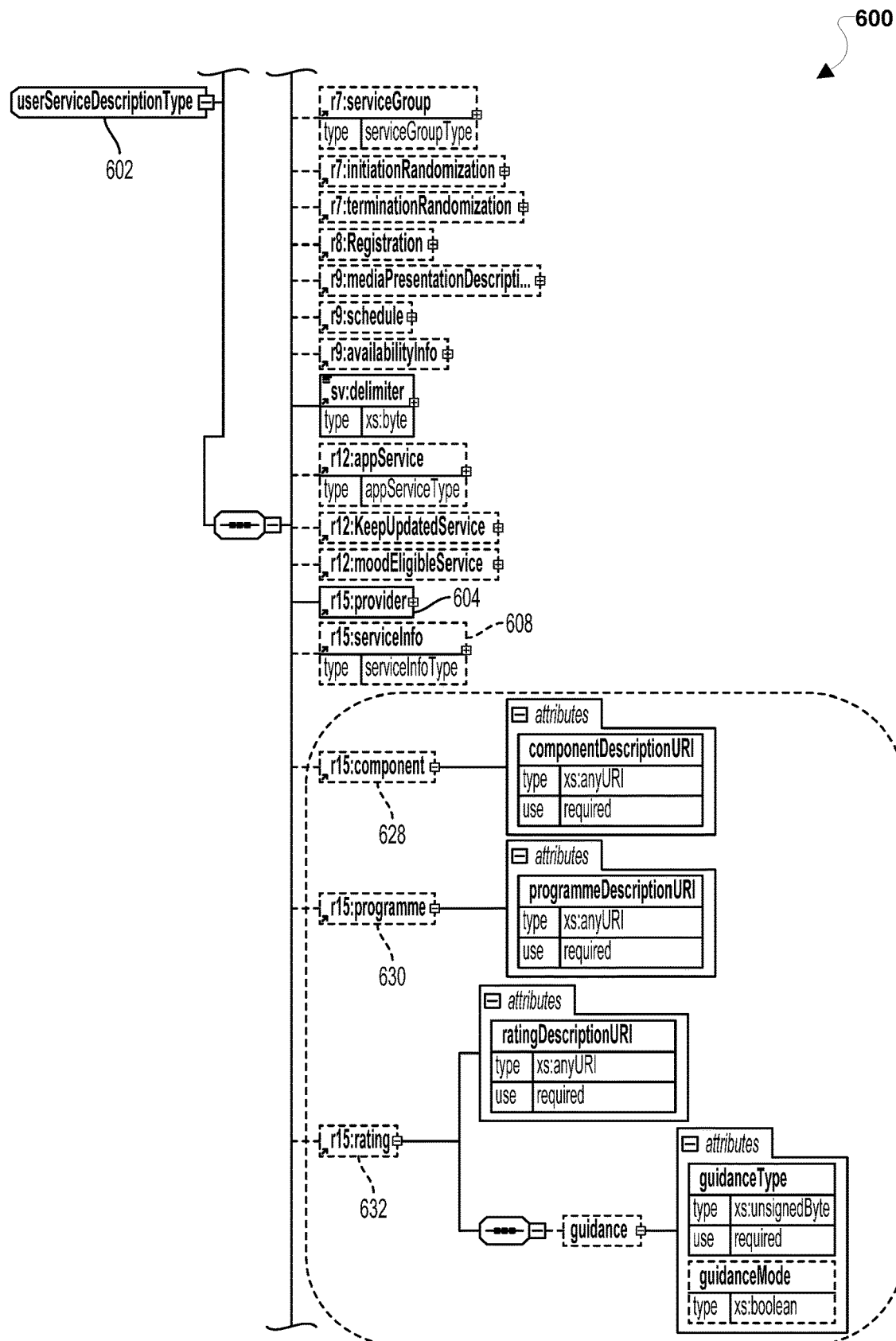

FIGS. 6A and 6B illustrate another portion of the user service bundle description (USBD) metadata fragment 600 according to various embodiments. With reference to FIGS. 1-6B, the USBD 600 may be similar to the USBD 204. In various embodiments, a network element of a cellular broadcast system (such as the network element 112 and 240) may configure the USBD 600 to include information that enables the cellular broadcast system to provide DTT services using terrestrial broadcast media content and service information. In some embodiments, the network element may configure the USBD 600 based on information included in terrestrial broadcast service information, such as a Service Description Table (such as the SDT 500).

In some embodiments, the configured USBD 600 may include one or more new elements added to information that may enable a receiving device to receive and present one or more DTT services (such as userServiceDescription element 602). The information added to the userServiceDescription element 602 may include information based on the terrestrial broadcast service information (such as the SDT 300). For example, the network element (e.g., the network element 112 and 240) may add one or more data elements to the userServiceDescription element 602 to convey information that may enable a receiving device to receive and present the DTT service. In some embodiments, the network element may add one or more data elements that include service provider-specific metadata and service-specific metadata to the userServiceDescription element 602.

Examples of service provider metadata may include elements describing a service provider name (such as provider element 604), which may be provided in one or more languages (such as language element 606). Examples of service-specific metadata may include an element describing service information (such as serviceInfo element 608). Elements describing the service information may include an identification of a conditional access system (such as numServiceId element 610), a system linkage (such as linkedService element 612), and an equivalent time-shift service (such as timeShiftService element 614). Examples of service-specific metadata also may include elements describing specific characteristics of terrestrial broadcast services, for example, DVB (such as in serviceInfoDVB element 616) and ATSC 3.0 (such as in serviceInfoATSC3 element 618). The service-specific metadata may include a service type (such as serviceTypeDVB element 620 and serviceTypeATSC3 element 622), available announcement types (such as announcementType element 624), and country availability (such as countryAvailability element 626).

In some embodiments, the configured USBD 600 may also include one or more references to additional USD information elements that provide additional information for the DTT service associated with userServiceDescriptionType element 602. For example, as shown in FIG. 6B, the userServiceDescriptionType element 602 may include data elements that refer to a component description (such as may be referenced by a uniform resource identifier (URI) contained in component element 628), a program description (such as may be referenced by a URI contained in program/programme element 630), and a rating description (such as may be referenced by a URI contained in rating element 632). In some embodiments, the component description, the program description, and the rating description in the userServiceDescriptionType element 602 may point to (e.g., via a respective URI) newly-defined MBMS USD fragments that include the program, component, and rating information.

The illustrated data elements 602-632 are not intended as limiting, and the USBD may include more or fewer data elements that provide, among other data, service provider metadata, and service-specific metadata.

FIG. 7 illustrates terrestrial broadcast service information 700 that may be used in various embodiments. With reference to FIGS. 1-7, a content provider (such as the content provider 114) may provide the terrestrial broadcast service information 700 to a network element of a cellular broadcast system (such as the network element 112 and 240). The content provider may provide the terrestrial broadcast service information together with, parallel to, or separate from media content (such as terrestrial broadcast media content).

The terrestrial broadcast service information 700 is an example of an Event Information Table (EIT), as may be used in a DVB system. The EIT may include Service Information (SI) metadata that may be used in an MPEG-2 transmission stream. In some embodiments, the EIT may include event information (such as information about a program or media content) describing one or more present, subsequent, and further future terrestrial broadcast television events (such as programs of the main service). In some embodiments, the EIT may include information (e.g., in one or more descriptors) such as an event name, an event start time, and event duration, and other event information. In some embodiments, the EIT also may include information such as a conditional access system ID, media component information, country availability, Free to Air content management policy information, as well as receiver device display metadata such as a textual program description, a multi-language program component description, a genre/classification, a link to an auxiliary service and/or a high-definition version of the same program, parental rating information, a time-shifted program indication, and other similar information.

Figure 8:
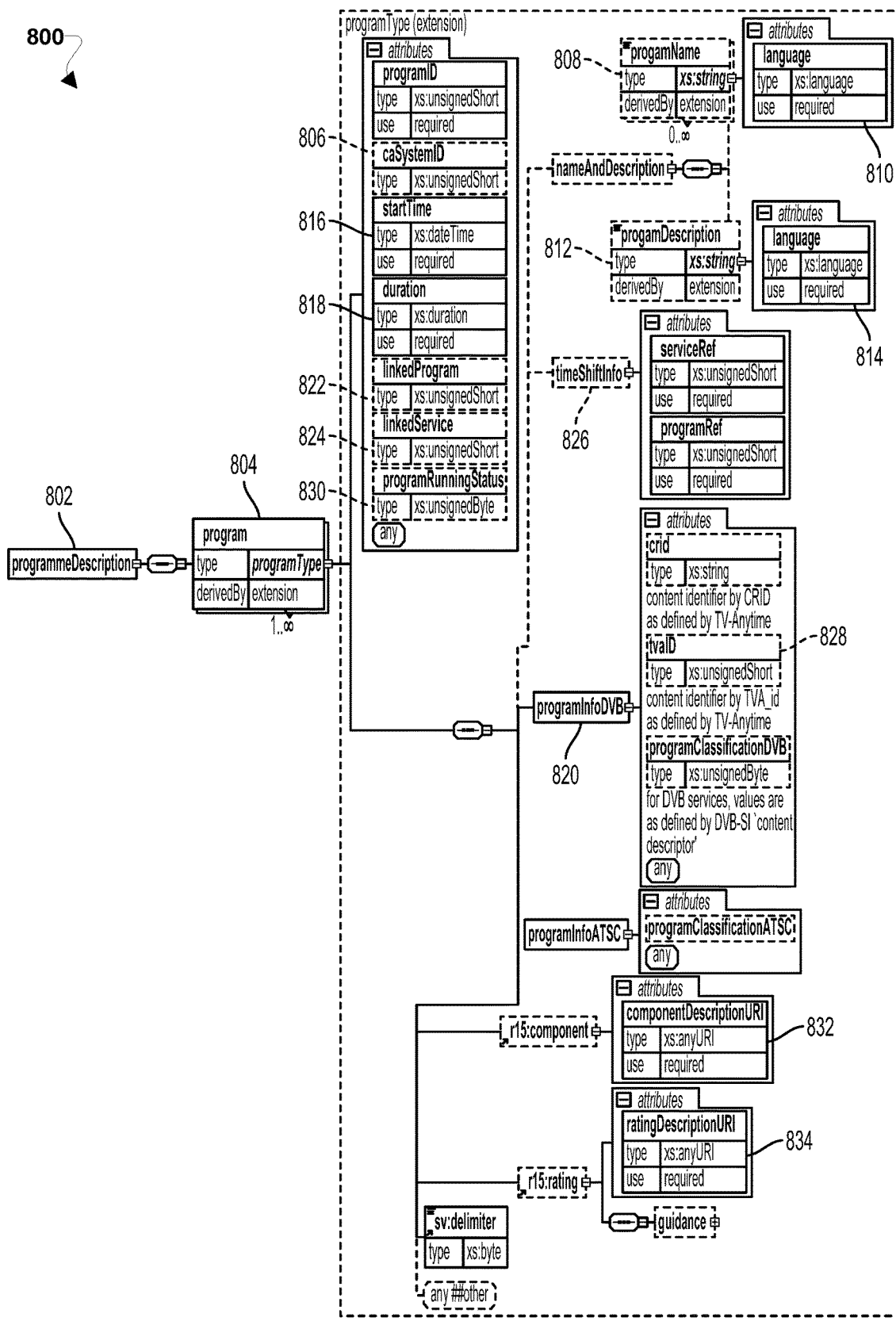
FIG. 8 is an illustration of a USD fragment according to various embodiments.

FIG. 8 illustrates a new user service description (USD) metadata fragment, a Programme Description 800, according to various embodiments. With reference to FIGS. 1-8, in some embodiments, the Programme Description 800 may represent an additional metadata fragment (e.g., an MBMS USD fragment) that includes program information that may be sent to a receiving device (e.g., the receiving devices 102 and 104) by a network element a cellular broadcast system (e.g., the network element 112 and 240). In various embodiments, the network element may configure the Programme Description 800 to include information that enables the cellular broadcast system to provide DTT services using terrestrial broadcast media content and service information. In some embodiments, the network element may configure the Programme Description 800 based on information included in terrestrial broadcast service information, such as an Event Information Table (such as the EIT 700).

In some embodiments, the configured Programme Description 800 may include one or more new elements that may enable a receiving device to receive and present one or more DTT services (such as programmeDescription element 802). The programmeDescription element 802 may include information based on the terrestrial broadcast service information (such as the EIT 700).

In some embodiments, prior to being configured by the network element, the Programme Description 800 may not include any information elements that correspond to the EIT 800. In such embodiments, the network element may newly add (or newly define) the programmeDescription element 802 and the information included therein in the Programme Description 800. For example, the network element (e.g., the network element 112 and 240) may add one or more data elements to the programmeDescription element 802 to convey information that may enable a receiving device to receive and present the DTT service.

In some embodiments, the network element may add one or more data elements to the programmeDescription element 802 that include metadata providing information about a program or other media content. In some embodiments, the information added to the Programme Description 800 may include Electronic Program Guide (EPG) metadata.

Examples of device metadata that the network element may include in the programmeDescription element 802 include a program identifier (such as program element 804), an identifier of a conditional access system that may be used to protect the program content (such as caSystemID element 806), a program (such as the programName element 808) in one or more languages (such as in the language element 810), a program description (such as the programDescription element 812) in one or more languages (such as in the language element 814), a program start time (such as the startTime element 816), a program duration (such as the duration element 818), content classification defined by the terrestrial broadcast system, such as DVB-defined content classification information (such as programInfoDVB element 820, a link to one or more auxiliary services or alternative content (such as linkedProgram element 822 and linkedService element 824), and time-shift version information (for example, if a program is included in a Near Video On Demand service) (such as timeShiftInfo element 826), a TV-Anytime defined content identifier (such as tvaID element 828), and a program running status (such as programRunningStatus element 830). The programmeDescription element 802 may also include metadata that the programmDescription element 802 may refer to, such as a descriptor indicating constituent media components of program (such as componentDescriptorURl element 832) and a rating description of parental rating and guidance information for a program (such as ratingDescriptionURl element 834).

The illustrated data elements 802-834 are not intended as limiting, and may include more or fewer data elements that provide, among other things, information about a program or other media content.

Figure 9A:
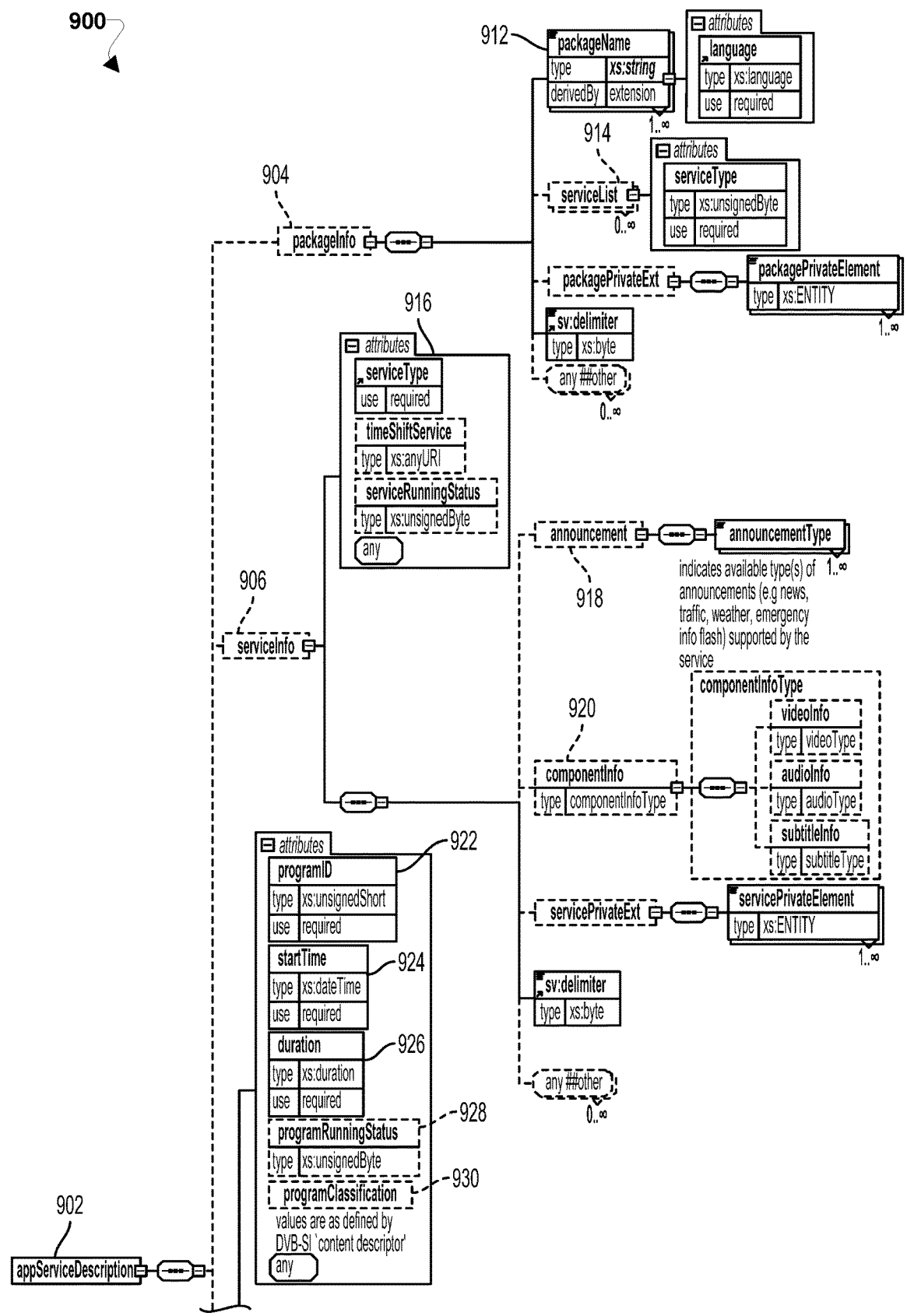
FIGS. 9A and 9B are illustrations of an application service description (ASD) according to various embodiments.
Figure 9B:
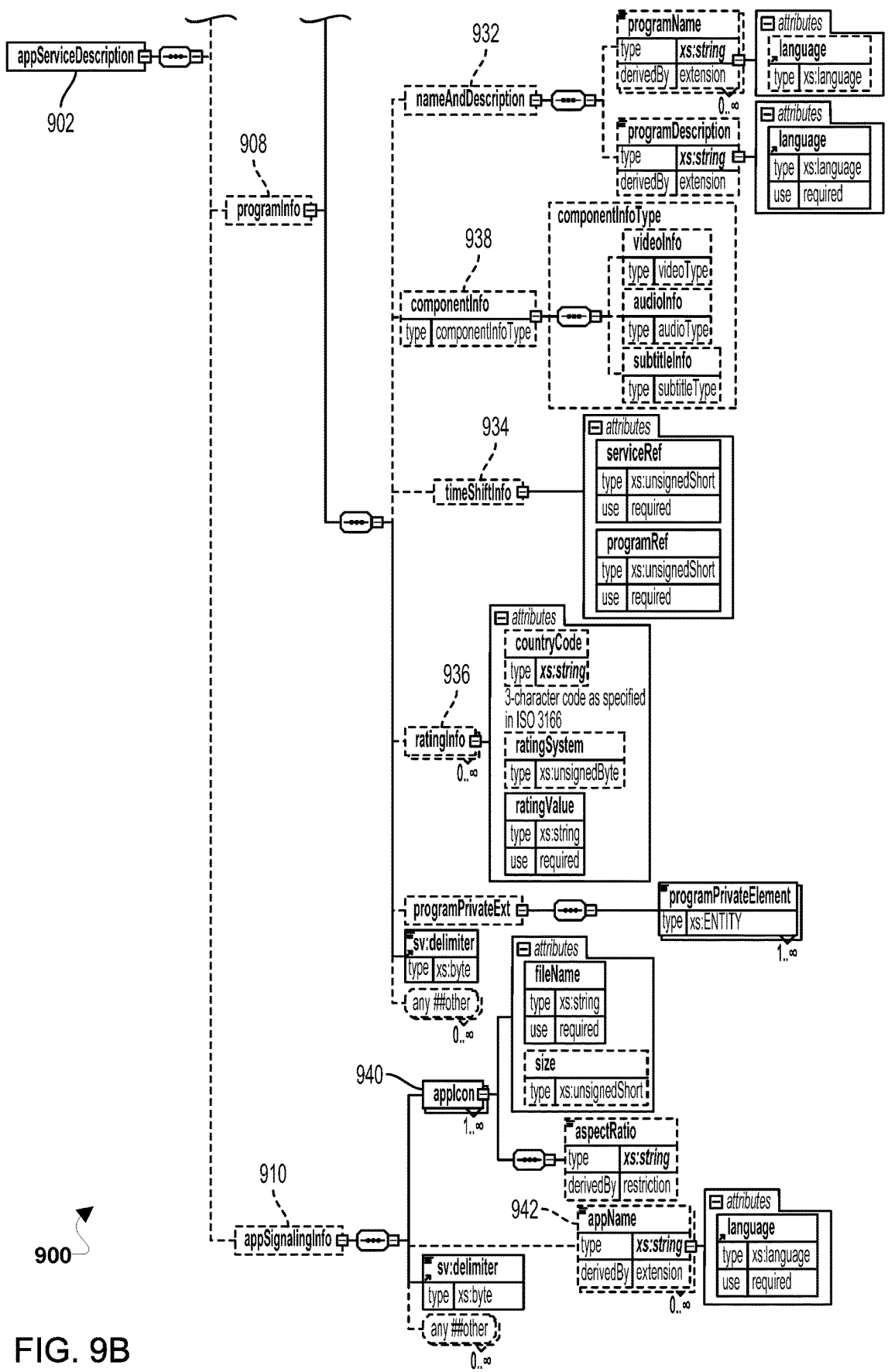

FIGS. 9A and 9B illustrate an application service description (ASD) 900 according to various embodiments. With reference to FIGS. 1-9, in various embodiments, a network element of a cellular broadcast system (such as the network element 112 and 240) may configure the ASD 900 to include information that enables the cellular broadcast system to provide DTT services using terrestrial broadcast media content and service information. In some embodiments, the network element may configure the ASD 900 based on information included in terrestrial broadcast service information, such as a Bouquet Association Table (e.g., the BAT 300), a Service Description Table (e.g., the SDT 500), an Event Information Table (e.g., the EIT 700), and/or an Application Signaling Description 1100 (see FIGS. 11A and 11B).

In some embodiments, an ASD (such as the ASD 900) may be transmitted separately from transport signaling as carried in the other user service description metadata fragments (e.g., the USBD 204, 400, 600, and the Programme Description 800). In some embodiments, the network element may define the data structure of the ASD 900 to include application-specific information related to DTT services, such as EPG information. In such embodiments, a receiver device may receive the ASD, which contains application-specific information related to the DTT services (e.g., the EPG information), separately from transport-specific information related to the DTT service carried in the other USD fragments.

In some embodiments, the network element may configure the ASD 900 to include metadata elements based on information included in terrestrial broadcast service information, such as a Bouquet Association Table (e.g., the BAT 300), a Service Description Table (e.g., the SDT 500), an Event InformationTable (e.g., the EIT 700), and/or an Application Signaling Description 1100. For example, the network element may configure the ASD 900 to include an appServiceDescription element 902. Examples of metadata that the network element may include in the appServiceDescription element 902 include package information about a package of services (such as packageInfo element 904), service-specific information (such as serviceInfo element 906), program information (such as programInfo element 908), and application signaling information (such as appSignalingInfo element 910).

The packageInfo element 904 may include metadata such as a package name (such as packageName element 912) and a list of one or more services in the package (such as serviceList element 914).

The serviceInfo element 906 may include metadata such as a service type (such as serviceType element 916), a service announcement (such as announcement element 918), and service component information (such as componentInfo element 920). In some embodiments, the service component information may include EPG-related information.

The programInfo element 908 (see FIG. 9B) may include metadata such as a program identifier (such as programID element 922), a program start time (such as startTime element 924), a program duration (such as duration element 926), a program running status (such as programRunningStatus element 928), and a program classification (such as programClassification element 930). The programInfo element 908 also may include metadata, such as a program name and description (such as one or more elements included under nameAndDescription element 932), time shift information (such as one or more elements included under timeShiftInfo element 934), rating information (such as one or more elements included under ratingInfo element 936), and program component information (such as one or more elements included under componentInfo element 938).

The appSignalingInfo element 910 may include metadata such as information describing an application icon (such as one or more elements included under appIcon element 940) and application name information (such as appName element 942).

In some embodiments, the network element may configure the ASD 900 to carry most or all EPG related data related to, for example, a service or program. In such embodiments, the network element may use one or more other USD fragments to convey (e.g., contain) transport signaling information, thereby separating transport signaling and application (e.g., EPG) signaling functions among different MBMS USD metadata fragments. In such embodiments, the network element may include various EPG-related information elements related to ratings and components (e.g., componentInfo element 920, ratingInfo element 936, and componentInfo element 938) directly in the ASD 900 (as opposed to referring to such information using a URI or similar data reference).

In some embodiments, the ASD may function as and/or be handled as an MBMS USD metadata fragment. In some embodiments, the ASD may include a "shell" or "container" that may encapsulate application service signaling that may, for example, use a defined data structure. For example, the data structure may include a DASH MPD when the MBMS User Service is a DASH-formatted streaming service. In such cases, a client application of the MPD may include a DASH client in the receiver device. As another example, the data structure encapsulated in the ASD may include an Apple HLS M3U8 manifest when the MBMS User Service is an HLS-formatted streaming service (and the client application may include an HLS player). In some embodiments, the data structure may include a standardized data structure. In some embodiments, the data structure may include a proprietary data structure.

The illustrated data elements 902-942 are not intended to be limiting, and the data structures may include more or fewer data elements.

FIG. 10 illustrates terrestrial broadcast service information 1000 that may be used in various embodiments. With reference to FIGS. 1-10, a content provider (such as the content provider 114) may provide the terrestrial broadcast service information 1000 to a network element of a cellular broadcast system (such as the network element 112 and 240). The content provider may provide the terrestrial broadcast service information together with, parallel to, or separate from media content (such as terrestrial broadcast media content).

The terrestrial broadcast service information 1000 is an example of an Application Information Table (AIT) as may be used in a DVB system. The AIT may include information about one or more interactive applications that may be associated with a terrestrial broadcast TV service. An interactive application may enable the device that is receiving a terrestrial broadcast TV service to send and receive additional information, or to otherwise interact with the application. For example, an interactive application may enable the device receiving the terrestrial broadcast TV service to provide a vote, participate in a quiz, obtain information about subject matter in media content, or interact with the application in another way.

Figure 11A:
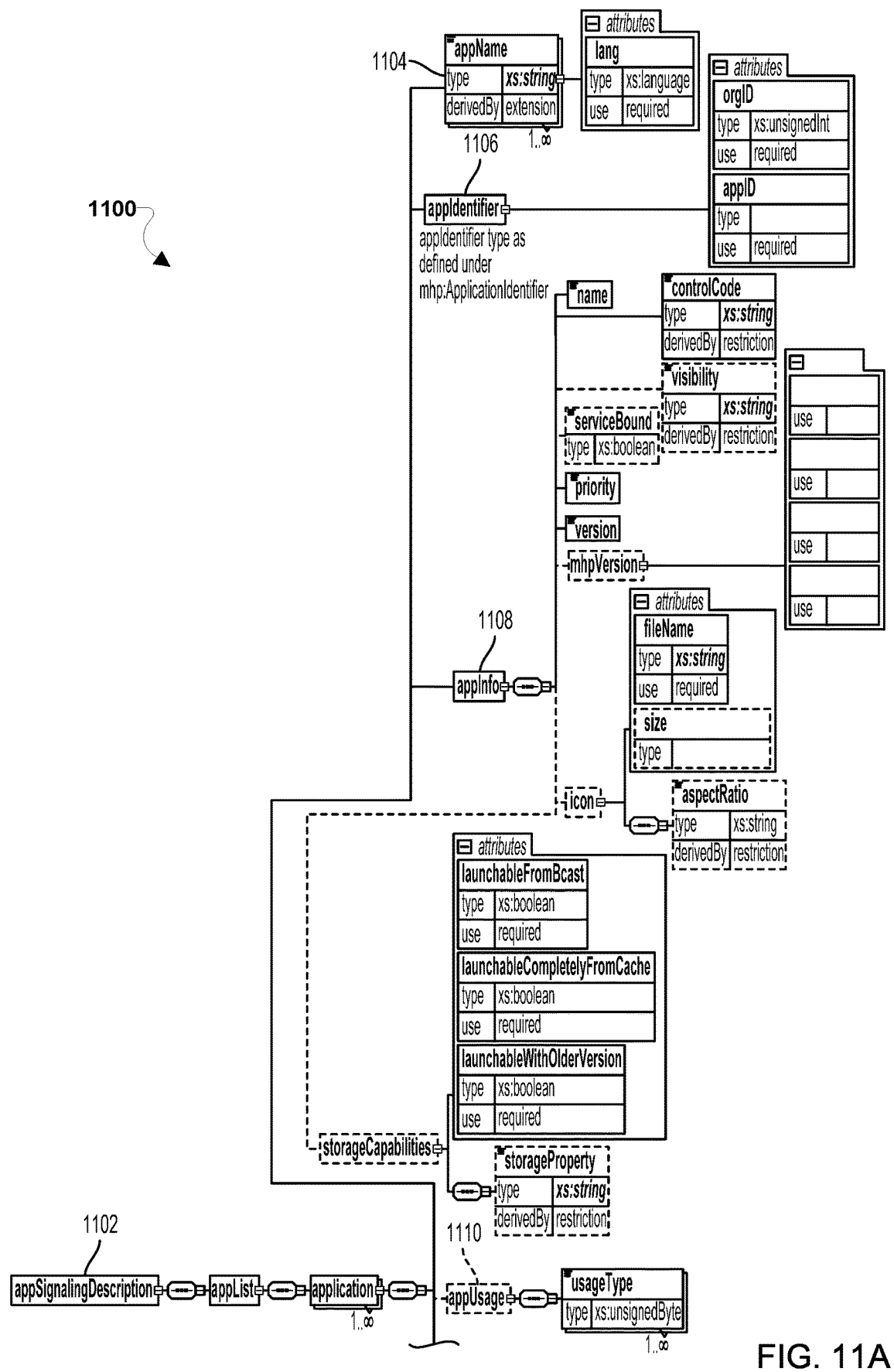
FIGS. 11A and 11B are illustrations of an Application Signaling Description according to various embodiments.
Figure 11B:
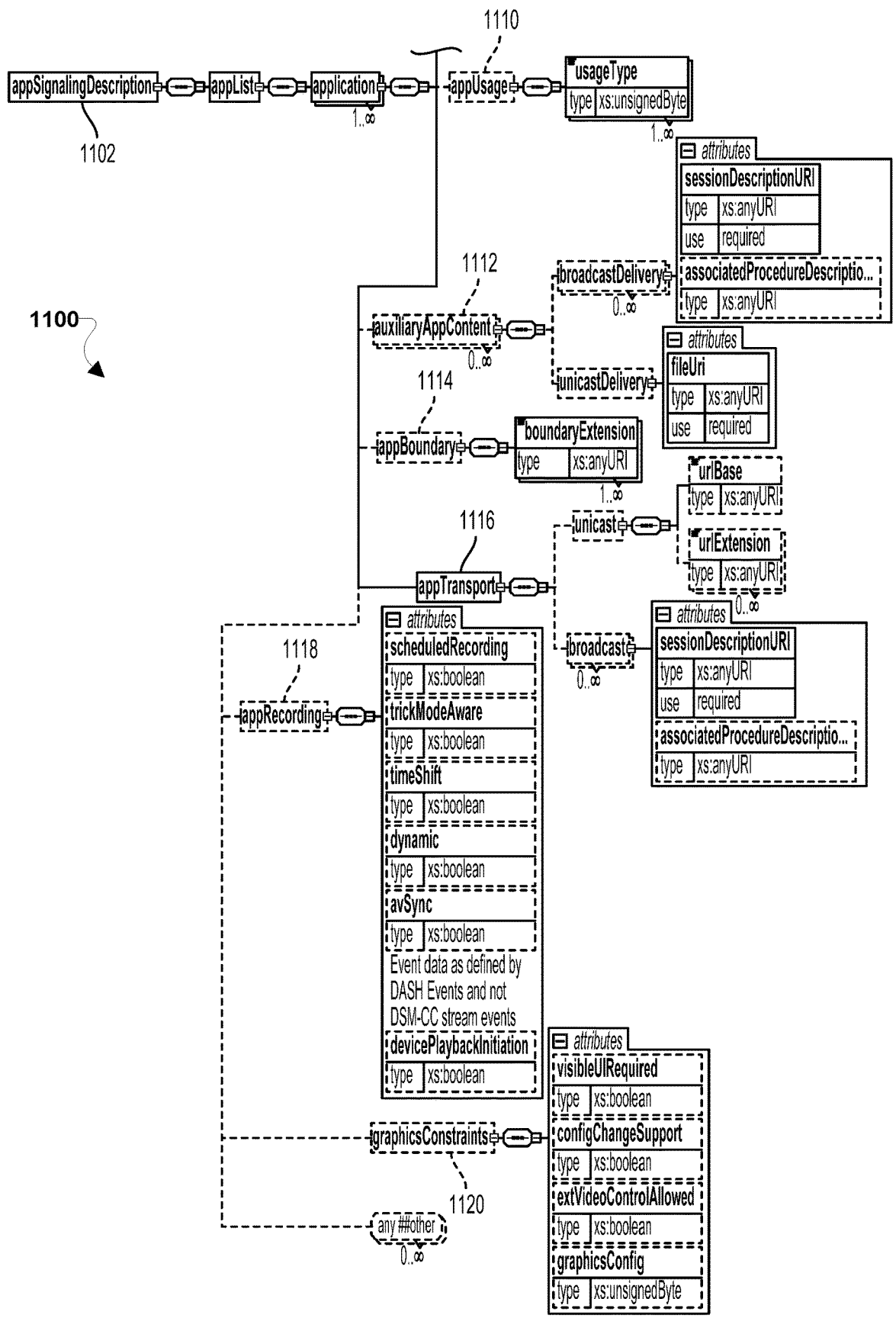

FIGS. 11A and 11B illustrate an Application Signaling Description 1100 according to various embodiments. With reference to FIGS. 1-11B, in various embodiments, a network element of a cellular broadcast system (such as the network element 112 and 240) may configure the Application Signaling Description 1100 to include information that enables the cellular broadcast system to provide DTT services using terrestrial broadcast media content and service information. In some embodiments, the information may include information about one or more interactive applications associated with a main terrestrial broadcast TV service. In some embodiments, the one or more interactive applications may enable a receiving device (e.g., the receiving devices 102 and 104) to display and control an interactive activity (e.g., provide a vote, participate in a quiz, obtain information about subject matter in media content, or interact with an application in some other way) associated with the received DTT service. In some embodiments, the network element may configure the Application Signaling Description 1100 based on information included in terrestrial broadcast service information, such as an application information table (e.g., the AIT 1000).

In some embodiments, the network element may generate the Application Signaling Description 1100 to provide information and/or functionality that may otherwise not be provided by a cellular broadcast system (e.g., MBMS). For example, a typical cellular broadcast system may not include an analogous message or signaling container for an application information table (e.g., the AIT 1000). In some embodiments, the network element may generate the Application Signaling Description 1100 to provide messaging and/or signaling that is analogous to an application information table or similar information provided by a terrestrial broadcast TV service. In some embodiments, the Application Signaling Description 1100 may include information that is related to transport signaling or other device-oriented metadata.

In some embodiments, the network element may add one or more data elements to an Application Signaling Description (such as appSignalingDescription element 1102) to provide the interactive application-related messaging and/or signaling.

Examples of metadata that the network element may include in the appSignalingDescription element 1102 include an interactive application name (such as appName element 1104), an interactive application identifier (such as appidentifier element 1106), and information about the interactive application (such as appinfo element 1108) that may include, e.g., profile and/or version information, display information related to an icon or other representation of the application, storage capabilities of the application, and the like. Examples of metadata that the network element may include in the appSignalingDescription element 1102 also includes application usage information (such as appUsage element 1110), information related to auxiliary application content (such as auxiliaryAppContent element 1112 (see FIG. 11B)) e.g., information related to broadcast and/or unicast delivery of the interactive application, application boundary information (such as appBoundary element 1114), information related to unicast and/or broadcast transport of the interactive application (such as appTransport element 1116), information related to permission to record the interactive application, and if recording permission is granted, the auxiliary data contents that shall be recorded along with the application (such as appRecording element 1118) e.g., information related to scheduling recordings, timeshift information, device playback information etc., and information related to any graphics or display constraints on the interactive application (such as graphicsConstraints element 1120).

The illustrated data elements 1102-1120 are not intended as limiting, and may include more or fewer data elements that provide, among other things, information about an interactive application.

In some embodiments, the network element may configure the USBD 204, 400, 600, the Programme Description 800 and the Application Signaling Description 1100 to strictly contain transport signaling. In such embodiments, the network element may configure the ASD 900 to carry EPG data and/or may provide the EPG data as an individual service (e.g., an MBMS user service), which may not be included in service signaling.

Figure 12:
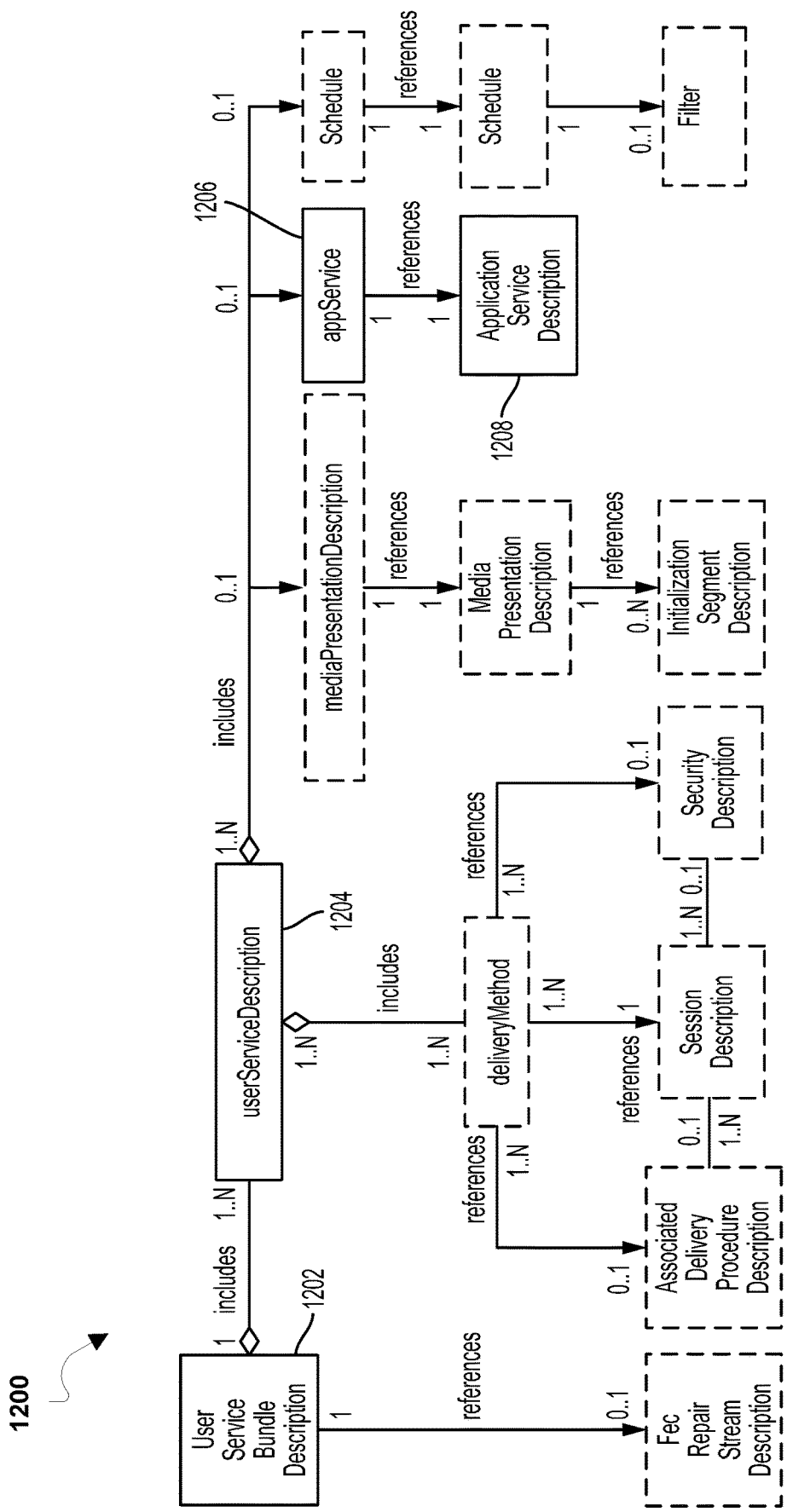
FIG. 12 is an illustration of a data model of information used in broadcast or multicast communication system according to various embodiments.

FIG. 12 illustrates an example of a data model 1200 for use in a cellular multicast or broadcast system (such as MBMS). In the data model 1200, a USBD 1202 may include a USD 1204, which may refer to an ASD 1208 that is included in the USBD 1202 as part of an element that includes application service information (such as appService element 1206). The elements in blocks 1202-1208 are intended to be illustrative only and nonlimiting. For example, alternatively or additionally, the data model 1200 may include one or more blocks (e.g., elements) that include information for another terrestrial broadcast TV system (e.g., ATSC 3.0).

Figure 13:
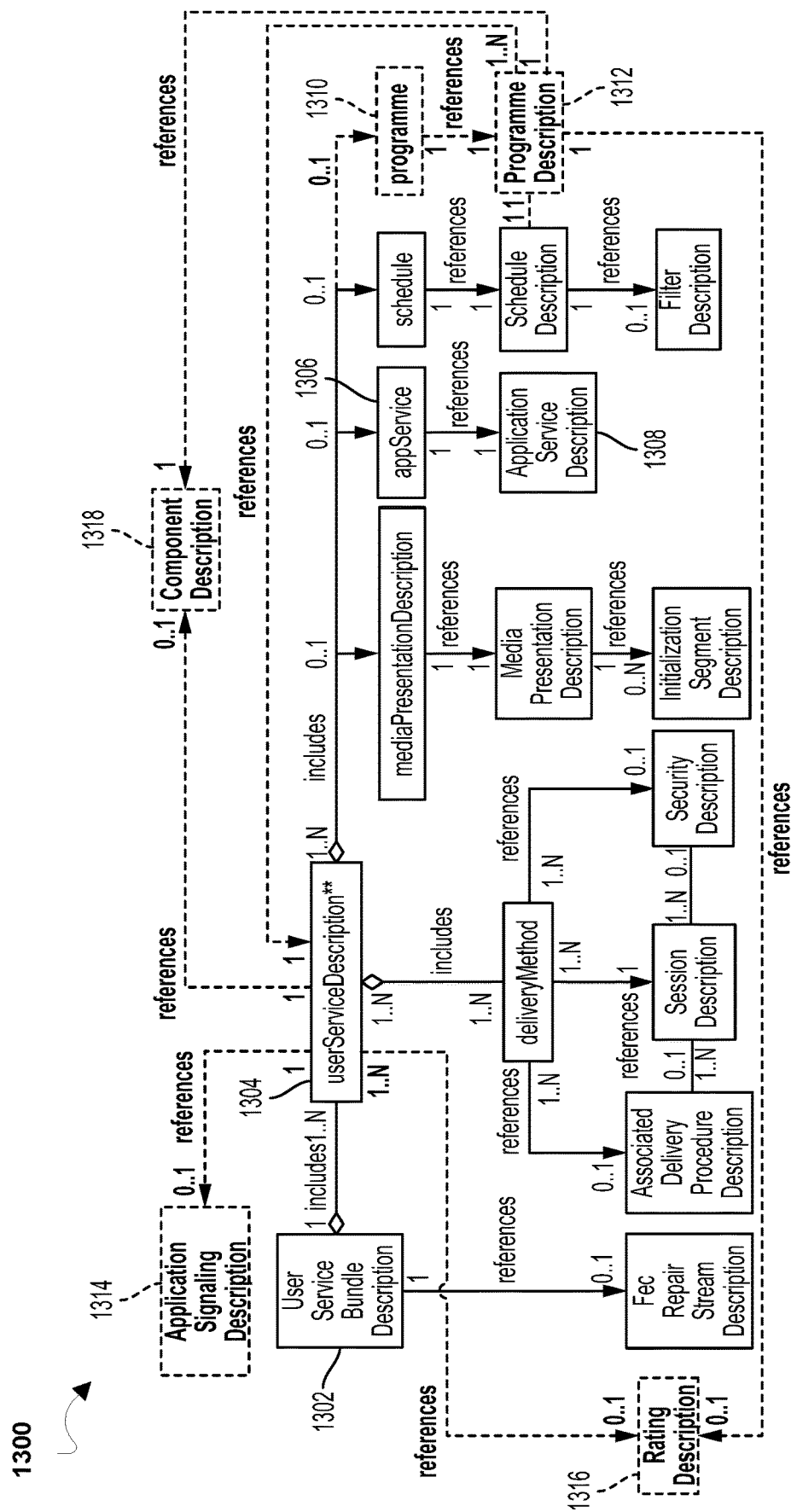
FIG. 13 is an illustration of a data model of information used in broadcast or multicast communication system according to various embodiments.

FIG. 13 illustrates a data model 1300 according to various embodiments. With reference to FIGS. 1-13, the data model 1300 illustrates information typically used in a multicast or broadcast system, such as a cellular broadcast system. In various embodiments, a network element (e.g., the network element 112 and 240) may send one or more elements of the data model 1300, alone or in any combination, to a receiving device (e.g., the receiving devices 102 and 104) to convey transport signaling information and application signaling information. A client application on a receiving device (e.g., the client applications 102a and 104a) may use the information in the data model 1300 to receive, process, and present content data at the receiving device. The data model 1300 illustrates information elements that may be used to enable a cellular broadcast system to provide DTT services.

A user service description bundle (USBD) 1302 may contain package and service related information, and may include references, such as a uniform resource locator (URL), to additional user service description (USD) information via a userServiceDescription element 1304. In some embodiments, the USBD 1302 may be similar to the USBD 204, 400, 600, and 800. The userServiceDescription element 1304 may refer to information provided in an application service description (ASD), such as Application Service Description 1308, which may be included in application-related information such as appService element 1306. In some embodiments, the Application Service Description 1108 may be similar to the ASD 900. The userServiceDescription element 1304 may refer to information provided in an Application Signaling Description (such as Application Signaling Description 1100).

In various embodiments, a network element may configure the userServiceDescription element 1304, the Application Service Description 1308, and/or the Application Signaling Description 1314 to include information that may enable a cellular broadcast system to provide DTT services. Such information may include, for example, DVB SI information and/or ATSC 3.0 information. The USBD 204, 400, 600, 800, and 1302 may contain a set of one or more userServiceDescription elements 1104. The ASD 900 described above provides an example of a configured Application Service Description 1308. In various embodiments, the network element may also configure the USBD 1302, via each of its one or more subordinate userServiceDescription elements to include one or more references to external USD information element (metadata fragments) that contain information that may describe, for example, individual programs of a service (such as Programme Description 1312), constituent media components of a service or program (such as Component Description 1318), and/or service or program rating information (such as Rating Description 1316). In some embodiments, the network element may include one or more of the Programme Description 1312, the Component Description 1318, and the Rating Description 1116 in an element such as programme element 1310, or in one or more other elements of the USBD 1302.

Figure 14:
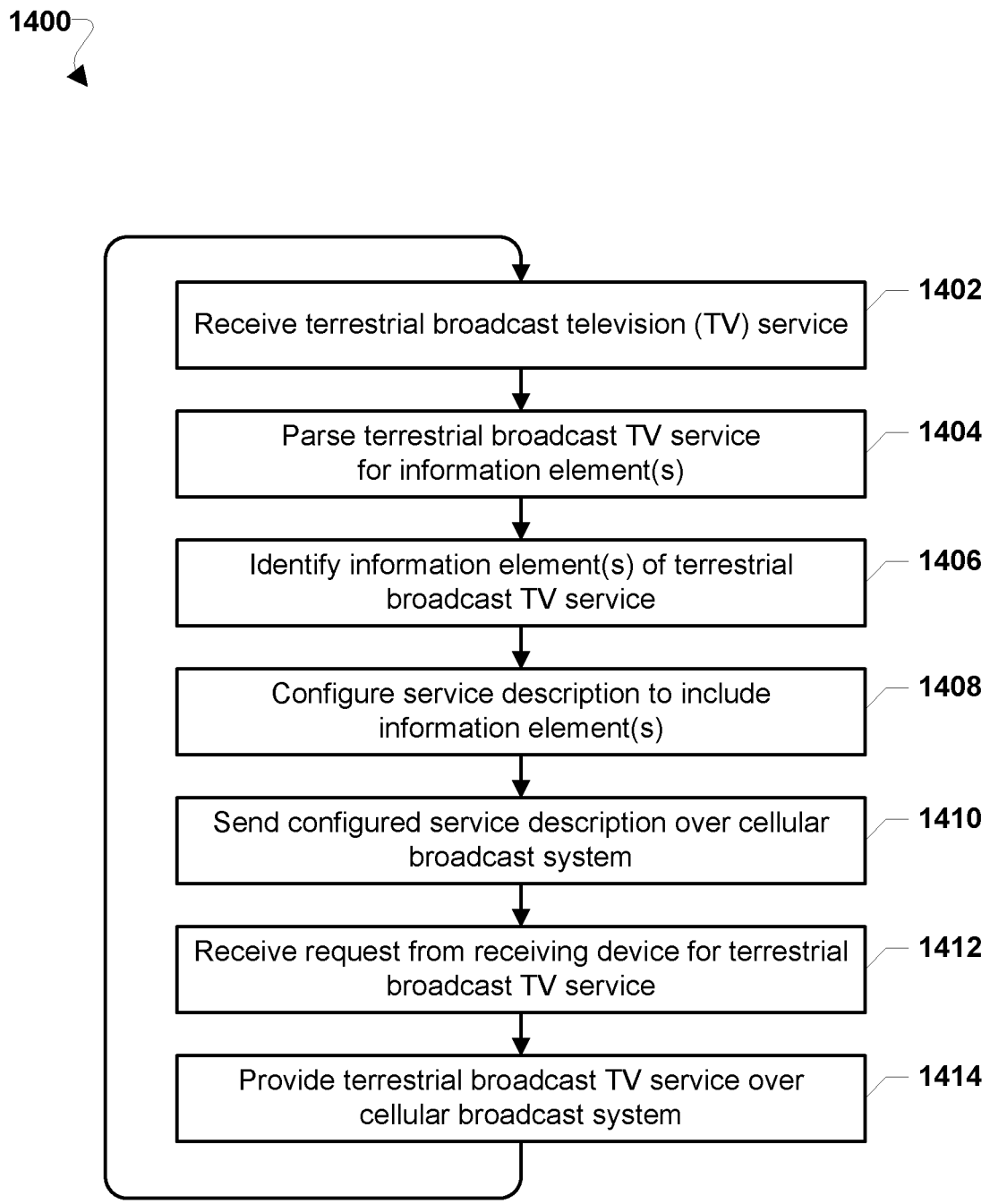
FIG. 14 is a process flow diagram illustrating a method of providing terrestrial broadcast television services over a cellular broadcast system according to various embodiments.

FIG. 14 illustrates a method 1400 of providing terrestrial broadcast television services over a cellular broadcast system according to various embodiments. With reference to FIGS. 1-14, the method 1400 may be implemented by a processor of a network element (e.g., the network element 112 and 240) or another similar processor.

In various embodiments, the processor of the network element may analyze (e.g., parse) a received terrestrial broadcast TV service. The processor of the network element may identify one or more transport signaling components and one or more application signaling components of the terrestrial broadcast TV service. In some embodiments, the terrestrial broadcast TV service may include transport signaling and application signaling components in a service description, such as a DVB service information. In some embodiments, the processor of the network element may translate and/or map the transport signaling and/or application signaling component(s) of the terrestrial broadcast TV service to one or more information elements in a service description of a cellular broadcast system. In some embodiments, the service description may include a USBD, an ASD, a programme description, a component description, a rating description, or an Application Signaling Description, as described above.

With regard to transport signaling component(s) of the terrestrial broadcast TV service, in some embodiments, the processor of the network element may add information to one or more existing elements, and/or may add one or more new elements, to one or more existing MBMS User Service Discovery/Announcement components to include transport signaling component(s) of the terrestrial broadcast TV service in the existing MBMS User Service Discovery/Announcement component(s). In some embodiments, the processor of the network element may add one or more new parameters (e.g., elements) to existing MBMS USD fragments such as the USBD. In some embodiments, the processor of the network element may add one or more new USD fragments, such as Programme Description, Component Description, Rating Description, or an Application Signaling Description.

With regard to application signaling component(s) of the terrestrial broadcast TV service (e.g., EPG-related metadata), in some embodiments, the processor of the network element may add one or more information elements to a signaling message (e.g., a "container") that is already defined within the framework of a USD. For example, the network element may add one or more information elements to an Application Service Description. Adding information elements to an ASD may enable interoperability of EPG applications for different terrestrial broadcast TV service providers (e.g., content provider 114) who may, for example, use eMBMS to provide DTT services and associated EPGs.

In some embodiments, the processor of the network element may provide application signaling component(s) of the terrestrial broadcast TV service as an independent cellular broadcast service. For example, the processor of the network element may provide service IDs or service classes (as it may be defined in 3GPP TS 26.346). In some embodiments, a client application of a receiver device (e.g., an EPG application, or an MBMS client) may use a service ID and/or service class to send a message (e.g., to a network element) requesting an EPG service. For example, an EPG application may request an EPG service using a service ID and/or service class, a network element may provide the EPG service to the EPG application in response to the request, the EPG application may receive the EPG service, and provide the EPG service to an MBMS application. As another example, an EPG application may register with an MBMS client, and upon registration of the EPG application, the MBMS client may download contents of the EPG service and provide the downloaded contents of the EPG service to the EPG application.

In block 1402, the processor of the network element may receive a terrestrial broadcast television (TV) service. For example, the network element 112 may receive the terrestrial broadcast TV service from a content provider (e.g., the content provider 114).

In block 1404, the processor of the network element may parse the terrestrial broadcast TV service for one or more information elements. For example, the terrestrial broadcast TV service may be provided by the content provider in a terrestrial broadcast TV standard, such as DVB-T/T2 or ATSC 3.0. In some embodiments, the processor may parse the terrestrial broadcast TV service for one or more information elements related to service signaling of the terrestrial broadcast TV standard. In some embodiments, service signaling information may be distinct and separate from media content information. In some embodiments, the parsed information elements may include at least one transport signaling element. In some embodiments, the parsed information elements may include at least one application signaling element.

In block 1406, the processor of the network element may identify the one or more information elements of the terrestrial broadcast TV service. In some embodiments, the processor of the network element may identify one or more information elements of the terrestrial broadcast TV service that may be missing or not included in typical (e.g., standard or unmodified) service signaling information of a cellular broadcast system or network (e.g., 3GPP MBMS or 3GPP2 BCMCS). In some embodiments, the processor of the network element may identify at least one transport signaling element and at least one application signaling element in the parsed information elements.

In block 1408, the processor of the network element may configure a service description of the cellular broadcast system to include one or more of the information elements. In some embodiments, the service description may include a user service description (e.g., the USBD 204, 400, 600, 800, 1004, and 1104). In some embodiments, the service description may include an application service description (e.g., the ASD 900, 1008, and 1108). In some embodiments, the service description may be included in a user service description bundle (e.g., the USBD 204, 400, 600, 800, 1004, and 1104).

In some embodiments, the processor of the network element may add the one or more information elements to an existing information element of the service description. In some embodiments, the processor of the network element may add a new element to the service description, and add the one or more information elements to the new element of the service description.

In some embodiments, the configured service description may include information that is analogous to, or based on, the information element(s) of the terrestrial broadcast TV service. In some embodiments, processor may configure the service description to include service signaling information that is adapted to the cellular broadcast system. In some embodiments, the service signaling information that is included in the configured service description may be analogous to, or based on, service signaling information of the terrestrial broadcast TV service.

In block 1410, the processor of the network element may send the configured service description over the cellular broadcast system. For example, the network element 112 may send the configured service description over the communication network 110. A receiving device (e.g., the receiving devices 102 and 104) may receive the configured service description.

In block 1412, the processor of the network element may receive from a receiving device a request for the terrestrial broadcast TV service. For example, the processor may receive a request from receiving device 102 and/or 104 for the terrestrial broadcast TV service.

In block 1414, the processor of the network element may provide the terrestrial broadcast TV service over the cellular broadcast system. In some embodiments, the processor of the network element may use the information included in the configured service description to provide the terrestrial broadcast TV service over the cellular broadcast system. In some embodiments, the processor of the network element may use the service signaling information that is included in the configured service description to provide the terrestrial broadcast TV service over the cellular broadcast system.

Various embodiments provide improvements to the function of a cellular broadcast system, as well as to the function of network elements of the cellular broadcast system and receiver devices of the cellular broadcast system, by enabling the provision of terrestrial broadcast TV services over a cellular broadcast network. Various embodiments provide improvements to the function of a cellular broadcast system (as well as network elements of and receiver devices) by providing transport and application-related signaling that is analogous to, or based on, information element(s) of a terrestrial broadcast TV service, thereby enabling the provision of the terrestrial broadcast TV service over the cellular broadcast network.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the elements of the USBD 204, 400, 600, and 800, the ASD 900, the Programme Description 800, the Application Signaling Description 1100, the Component Description 1314, and the Rating Description 1316 and the operations of the method 1200 may be substituted for or combined with one or more elements and/or operations of the USBD 204, 400, 600, and 800, the ASD 900, the Programme Description 800, the Application Signaling Description 1100, the Component Description 1314, and the Rating Description 1316, and the method 1200, and vice versa.

Figure 15:
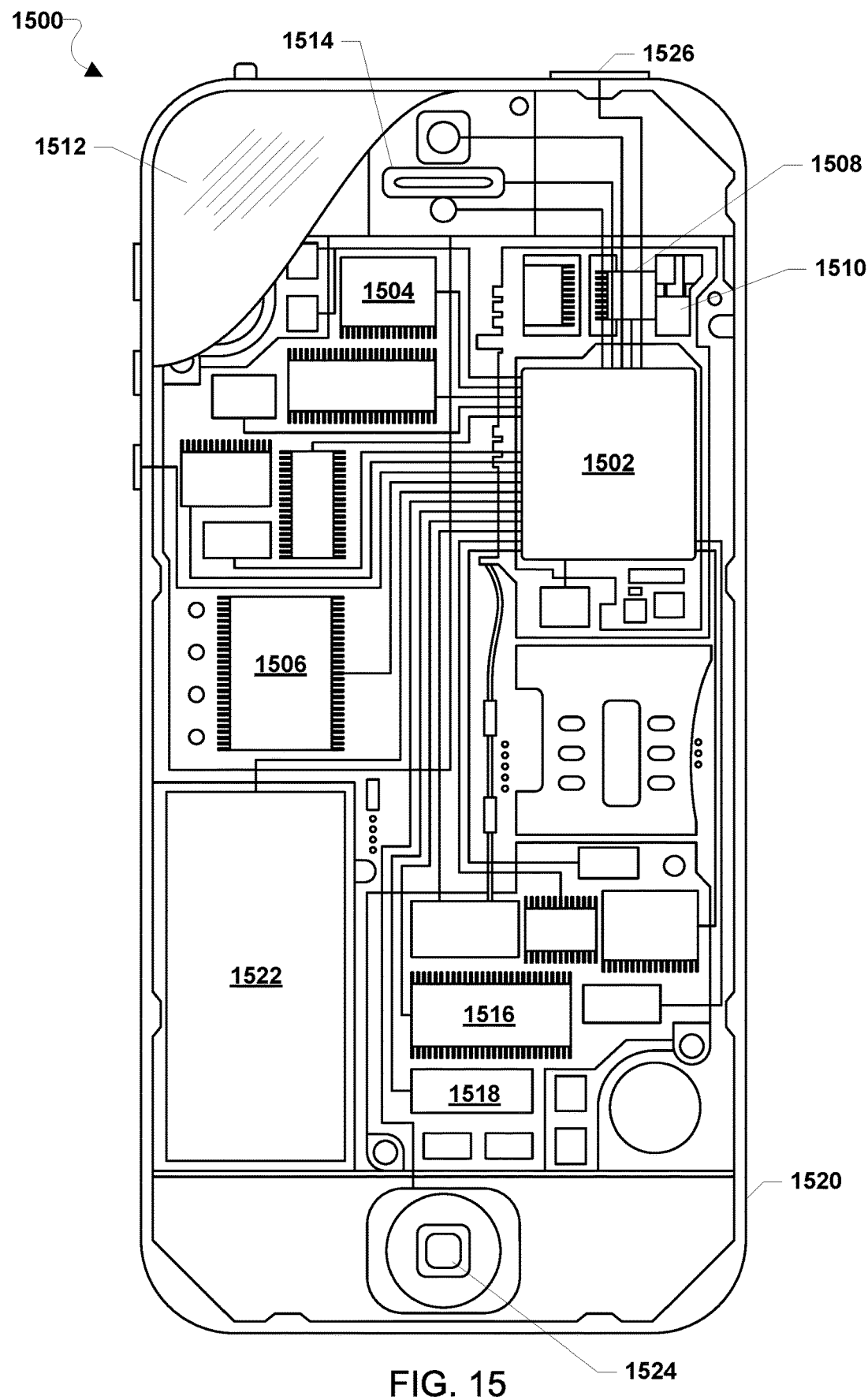
FIG. 15 is a component diagram of a receiver device suitable for use with various embodiments.

Various embodiments may be implemented in any of a variety of receiver devices, an example of which is illustrated in FIG. 15. For example, the receiver device 1500 may include a processor 1502 coupled to internal memories 1504 and 1506. Internal memories 1504 and 1506 may be volatile or non-volatile memories, and may also be secure and/or encrypted memories, or unsecure and/or unencrypted memories, or any combination thereof. The processor 1502 may also be coupled to a touch screen display 1512, such as a resistive-sensing touch screen, capacitive-sensing touch screen infrared sensing touch screen, or the like. Additionally, the display of the receiver device 1500 need not have touch screen capability. The receiver device 1500 may have one or more radio signal transceivers 1508 (e.g., Peanut®, Bluetooth®, ZigBee®, Wi-Fi, radio frequency (RF) radio) and antennae 1510, for sending and receiving, coupled to each other and/or to the processor 1502. The receiver device 1500 may include a cellular network interface, such as wireless modem chip 1516, that enables communication via a cellular data network (e.g., CDMA, TDMA, GSM, PCS, 3G, 4G, LTE, ATSC 3.0, DVB-T/T2 or any other type of cellular or broadcast data network) and is coupled to the processor 1502. The receiver device 1500 may include a peripheral device connection interface 1518 coupled to the processor 1502. The peripheral device connection interface 1518 may be singularly configured to accept one type of connection, or multiply configured to accept various types of physical and communication connections, common or proprietary, such as USB, FireWire, Thunderbolt, or PCIe. The peripheral device connection interface 1518 may also be coupled to a similarly configured peripheral device connection port. The receiver device 1500 may also include speakers 1514 for providing audio outputs. The receiver device 1500 may also include a housing 1520, constructed of a plastic, metal, or a combination of materials, for containing all or some of the components discussed herein. The receiver device 1500 may include a power source 1522 coupled to the processor 1502, such as a disposable or rechargeable battery. The rechargeable battery may also be coupled to the peripheral device connection port to receive a charging current from a source external to the receiver device 1500. The receiver device 1500 may also include a physical button 1524 for receiving user inputs, and a power button 1526 for turning the receiver device 1500 on and off.

Figure 16:
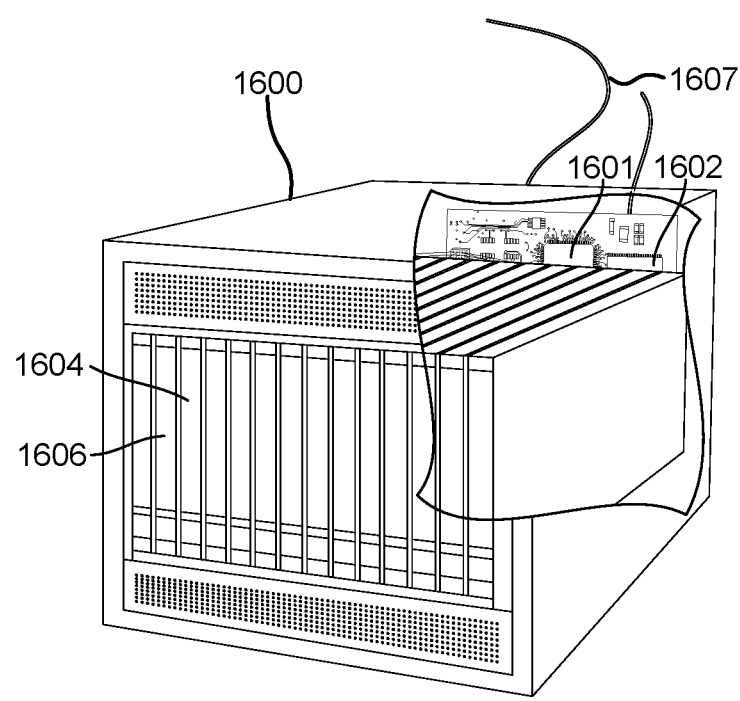
FIG. 16 is a component diagram of a network element suitable for use with various embodiments.

Various embodiments may also be implemented on any of a variety of commercially available network element devices, such as the network element 1600 illustrated in FIG. 16. Such a network element 1600 typically includes a processor 1601 coupled to volatile memory 1602 and a large capacity nonvolatile memory, such as a disk drive 1604. The network element 1600 may also include a floppy disc drive, compact disc (CD) or DVD disc drive 1606 coupled to the processor 1601. The network element 1600 may also include network access ports 1607 coupled to the processor 1601 for establishing network interface connections with a communication network, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 1502 and 1601 may be any programmable microprocessor, microcomputer or multiple processor chip or chips that can be configured by software instructions (applications) to perform a variety of functions, including the functions of the various embodiments described above.

In some devices, multiple processors may be provided, such as one processor dedicated to wireless communication functions and one processor dedicated to running other applications. Typically, software applications may be stored in the internal memory 1504, 1506, 1602, and 1604 before they are accessed and loaded into the processors 1504 and 1506. The processors 1504 and 1506 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1504 and 1506 including internal memory or removable memory plugged into the device and memory within the processor 1504 and 1506 themselves.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, components, circuits, and algorithm operations described in connection with the embodiments disclosed herein may be implemented as electronic hardware, computer software, or combinations of both. To clearly illustrate this interchangeability of hardware and software, various illustrative components, blocks, components, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or a non-transitory processor-readable storage medium. The steps of a method or algorithm disclosed herein may be embodied in a processor-executable software component that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of providing a terrestrial broadcast television service over a cellular broadcast system, comprising:
    parsing the terrestrial broadcast television service for one or more information elements, wherein parsing the terrestrial broadcast television service comprises identifying one or more transport signaling components and one or more application signaling components;
    configuring a Multimedia Broadcast Multicast Service (MBMS) user service description (USD) of the cellular broadcast system to include the one or more information elements of the terrestrial broadcast television service, wherein the configured user service description comprises an application service description (ASD) metadata fragment that includes electronic program guide information that can be presented in an electronic program guide; and
    sending the configured user service description over the cellular broadcast system to a receiving device to enable the receiving device to present the electronic program guide information in an electronic program guide and to receive the terrestrial broadcast television service over the cellular broadcast system.

2. The method of claim 1, wherein the parsed one or more information elements comprise at least one transport signaling element.

3. The method of claim 1, wherein the parsed one or more information elements comprise at least one application signaling element.

4. The method of claim 1, wherein the user service description comprises a user service bundle description.

5. The method of claim 4, wherein the user service description comprises the user service bundle description and one or more information elements references by the user service bundle description.

6. The method of claim 1, wherein the user service description comprises a programme description.

7. The method of claim 1, wherein the user service description comprises an application signaling description.

8. The method of claim 1, wherein the user service description comprises a component description.

9. The method of claim 1, wherein the user service description comprises a rating description.

10. The method of claim 1, wherein configuring the user service description of the cellular broadcast system to include the one or more information elements of the terrestrial broadcast television service comprises adding the one or more information elements to one or more existing information elements of the service description.

11. The method of claim 1, wherein configuring the user service description of the cellular broadcast system to include the one or more information elements of the terrestrial broadcast television service comprises adding one or more new elements to the user service description and adding the one or more information elements to the one or more new elements of the user service description.

12. The method of claim 1, further comprising:
receiving from the receiving device a request for the terrestrial broadcast television service, wherein the request is based on the configured service description.

13. The method of claim 1, further comprising:
providing the terrestrial broadcast television service to the receiving device over the cellular broadcast system.

14. A network element, comprising:
a network access port configured to interface with a communications network; and
a processor coupled to the network access port and configured with processor-executable instructions to perform operations comprising:
parsing a terrestrial broadcast television service for one or more information elements, wherein parsing the terrestrial broadcast television service comprises identifying one or more transport signaling components and one or more application signaling components;
configuring a Multimedia Broadcast Multicast Service (MBMS) user service description (USD) of a cellular broadcast system to include the one or more information elements of the terrestrial broadcast television service, wherein the configured user service description comprises an application service description (ASD) metadata fragment that includes electronic program guide information that can be presented in an electronic program guide; and
sending the configured user service description over the cellular broadcast system to a receiving device to enable the receiving device to present the electronic program guide information in an electronic program guide and to receive the terrestrial broadcast television service over the cellular broadcast system.

15. The network element of claim 14, wherein the processor is further configured with processor-executable instructions to perform operations such that the parsed one or more information elements comprise at least one transport signaling element.

16. The network element of claim 14, wherein the processor is further configured with processor-executable instructions to perform operations such that the parsed one or more information elements comprise at least one application signaling element.

17. The network element of claim 14, wherein the processor is further configured with processor-executable instructions to perform operations such that the user service description comprises a user service bundle description.

18. The network element of claim 17, wherein the processor is further configured with processor-executable instructions to perform operations such that the user service description comprises the user service bundle description and one or more information elements references by the user service bundle description.

19. The network element of claim 14, wherein the processor is further configured with processor-executable instructions to perform operations such that the user service description comprises one or more of a program description, an application signaling description, a component description, or a rating description.

20. The network element of claim 14, wherein the processor is further configured with processor-executable instructions to perform operations such that configuring the user service description of the cellular broadcast system to include the one or more information elements of the terrestrial broadcast television service comprises adding the one or more information elements to one or more existing information elements of the user service description.

21. The network element of claim 14, wherein the processor is further configured with processor-executable instructions to perform operations such that configuring the user service description of the cellular broadcast system to include the one or more information elements of the terrestrial broadcast television service comprises adding one or more new elements to the user service description and adding the one or more information elements to the one or more new elements of the user service description.

22. The network element of claim 14, wherein the processor is configured with processor-executable instructions to perform operations further comprising:
receiving from the receiving device a registration for the terrestrial broadcast television service, wherein the registration is based on the configured service description.

23. The network element of claim 14, wherein the processor is configured with processor-executable instructions to perform operations further comprising:
providing the terrestrial broadcast television service to the receiving device over the cellular broadcast system.

24. A network element, comprising:
means for parsing a terrestrial broadcast television service for one or more information elements, wherein means for parsing the terrestrial broadcast television service comprises means for identifying one or more transport signaling components and one or more application signaling components;
means for configuring a Multimedia Broadcast Multicast Service (MBMS) user service description (USD) of a cellular broadcast system to include the one or more information elements of the terrestrial broadcast television service, wherein the configured user service description comprises an application service description (ASD) metadata fragment that includes electronic program guide information that can be presented in an electronic program guide; and
means for sending the configured user service description over the cellular broadcast system to a receiving device to enable the receiving device to present the electronic program guide information in an electronic program guide and to receive the terrestrial broadcast television service over the cellular broadcast system.

25. A non-transitory processor-readable medium having stored thereon processor-executable instructions configured to cause a processor of a network element to perform operations comprising:

parsing a terrestrial broadcast television service for one or more information elements, wherein parsing the terrestrial broadcast television service comprises identifying one or more transport signaling components and one or more application signaling components;

configuring a Multimedia Broadcast Multicast Service (MBMS) user service description (USD) of a cellular broadcast system to include the one or more information elements of the terrestrial broadcast television service, wherein the configured user service description comprises an application service description (ASD) metadata fragment that includes electronic program guide information that can be presented in an electronic program guide; and sending the configured user service description over the cellular broadcast system to a receiving device to enable the receiving device to present the electronic program guide information in an electronic program guide and to receive the terrestrial broadcast television service over the cellular broadcast system.

\* \* \* \* \*